(12) United States Patent
Kadu et al.

(10) Patent No.: US 11,430,095 B2
(45) Date of Patent: Aug. 30, 2022

(54) AUTOMATIC DISPLAY MANAGEMENT METADATA GENERATION FOR GAMING AND/OR SDR+ CONTENTS

(71) Applicant: DOLBY LABORATORIES LICENSING CORPORATION, San Francisco, CA (US)

(72) Inventors: Harshad Kadu, Santa Clara, CA (US); Guan-Ming Su, Fremont, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/277,480

(22) PCT Filed: Sep. 18, 2019

(86) PCT No.: PCT/US2019/051700
§ 371 (c)(1),
(2) Date: Mar. 18, 2021

(87) PCT Pub. No.: WO2020/061172
PCT Pub. Date: Mar. 26, 2020

(65) Prior Publication Data
US 2021/0350512 A1 Nov. 11, 2021

Related U.S. Application Data

(60) Provisional application No. 62/733,217, filed on Sep. 19, 2018.

(30) Foreign Application Priority Data

Sep. 19, 2018 (EP) .................................... 18195471

(51) Int. Cl.
*G06T 5/40* (2006.01)
*G06T 5/00* (2006.01)
(Continued)

(52) U.S. Cl.
CPC ............ *G06T 5/009* (2013.01); *A63F 13/355* (2014.09); *G06T 5/40* (2013.01); *H04N 5/57* (2013.01);
(Continued)

(58) Field of Classification Search
CPC . G06T 5/009; G06T 5/40; G06T 2207/10016; G06T 2207/10024; G06T 2207/20081; G06T 2207/20208
See application file for complete search history.

(56) References Cited

U.S. PATENT DOCUMENTS 10,062,333 B2 * 8/2018 Farrell ..................... G09G 3/36
10,244,244 B2 * 3/2019 Piramanayagam ....... G06T 7/00
(Continued)

FOREIGN PATENT DOCUMENTS

CN         107111980 B     8/2017

OTHER PUBLICATIONS

ITU-R BT.1886 "Reference Electro-Optical Transfer Function for Flat Panel Displays Used in HDTV Studio Production" p. 1-7.
(Continued)

*Primary Examiner* — Brian P Yenke

(57) ABSTRACT

Different candidate image data feature types are evaluated to identify one or more specific image data feature types to be used in training a prediction model for optimizing one or more image metadata parameters. A plurality of image data features of the one or more selected image data feature types is extracted from one or more images. The plurality of image data features of the one or more selected image data feature types is reduced into a plurality of significant image data features. A total number of image data features in the plurality of significant image data features is no larger than a total number of image data features in the plurality of image data features of the one or more selected image data
(Continued)

feature types. The plurality of significant image data features is applied to training the prediction model for optimizing one or more image metadata parameters.

11 Claims, 9 Drawing Sheets

(51) Int. Cl.
*A63F 13/355* (2014.01)
*H04N 19/46* (2014.01)
*H04N 5/57* (2006.01)

(52) U.S. Cl.
CPC .... *H04N 19/46* (2014.11); *G06T 2207/10016* (2013.01); *G06T 2207/10024* (2013.01); *G06T 2207/20081* (2013.01); *G06T 2207/20208* (2013.01)

(56) References Cited

U.S. PATENT DOCUMENTS

| | | | | |
|---|---|---|---|---|
| 10,311,558 | B2* | 6/2019 | Su | G06T 5/007 |
| 10,313,687 | B2* | 6/2019 | Stessen | H04N 19/98 |
| 10,542,242 | B2* | 1/2020 | Lim | H04N 9/3179 |
| 10,609,424 | B2* | 3/2020 | Song | H04N 19/1887 |
| 10,972,759 | B2* | 4/2021 | Lee | G09G 5/10 |
| 10,977,779 | B2* | 4/2021 | McCarthy | H04N 19/70 |
| 10,984,510 | B2* | 4/2021 | Kozuka | H04N 5/66 |
| 11,272,213 | B2* | 3/2022 | Su | H04N 19/463 |
| 11,277,627 | B2* | 3/2022 | Song | H04N 19/154 |
| 2015/0220813 | A1 | 8/2015 | Heirich | |
| 2016/0165256 | A1* | 6/2016 | Van Der Vleuten | H04N 19/46 375/240.01 |
| 2016/0210730 | A1* | 7/2016 | Eto | G09G 5/10 |
| 2016/0292834 | A1* | 10/2016 | Tsuru | H04N 9/69 |
| 2016/0343348 | A1* | 11/2016 | Oh | G09G 5/10 |
| 2017/0085878 | A1* | 3/2017 | Sole Rojals | H04N 19/70 |
| 2018/0020224 | A1 | 1/2018 | Su | |
| 2018/0098094 | A1 | 4/2018 | Wen | |
| 2020/0134792 | A1* | 4/2020 | Mandal | H04N 1/4074 |
| 2021/0150680 | A1* | 5/2021 | Gadgil | G06T 5/40 |
| 2021/0224963 | A1* | 7/2021 | Uchimura | H04N 5/57 |
| 2021/0287348 | A1* | 9/2021 | Partin | G06T 5/009 |
| 2022/0058783 | A1* | 2/2022 | Kadu | G06T 5/009 |

OTHER PUBLICATIONS

Rasmussen, C. E, et al "Gaussian Process for Machine Learning" MIT Press, Nov. 23, 2005.

SMPTE ST 2084:2014 "High Dynamic Range Electro-Optical Transfer Function of Mastering Reference Displays".

* cited by examiner determine training images and targeted values for image metadata parameters 452 extract a image data features from the training images 454 apply the image data features and the targeted values to training prediction models 456 use the prediction models to generate optimized values for the image metadata parameters for non-training images 458 cause the optimized values for the image metadata parameters to be used in rendering the non-training images 460

*FIG. 4B*

AUTOMATIC DISPLAY MANAGEMENT METADATA GENERATION FOR GAMING AND/OR SDR+ CONTENTS

CROSS-REFERENCE TO RELATED APPLICATIONS

This application claims priority to U.S. Provisional Patent Application No. 62/733,217, filed Sep. 19, 2018 and European Patent Application No. 18195471.0, filed Sep. 19, 2018, each of which is hereby incorporated by reference in its entirety.

TECHNOLOGY

The present invention relates generally to images. More particularly, an embodiment of the present invention relates to automatic display management (DM) metadata generation for gaming and/or SDR plus (SDR+) video contents.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE. As appreciated by the inventors here, improved techniques for encoding and decoding video data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated. US 2015/0220813 A1 discloses providing a set of pre-adjusted images including source images of the pre-adjusted images, the pre-adjusted images including image filter parameters. US 2015/0220813 A1 further discloses that histogram information for each of the source images is computed, and that a learning algorithm is applied to the set. US 2015/0220813 A1 discloses that the learning algorithm is configured to map the histogram information to the image filter parameters, and that a real-time image is processed based on the mapping of the histogram information to the image filter parameters.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Automatic DM metadata generation for gaming and/or SDR+ video contents is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to image metadata optimization. A set of one or more different candidate image data feature types is evaluated to identify one or more specific image data feature types to be used in a prediction model for optimizing one or more image metadata parameters. A plurality of image data features of the one or more selected image data feature types is extracted from one or more images. The plurality of image data features of the one or more selected image data feature types is reduced into a plurality of significant image data features. A total number of image data features in the plurality of significant image data features is no larger than a total number of image data features in the plurality of image data features of the one or more selected image data feature types. The plurality of significant image data features is applied to training the prediction model for optimizing one or more image metadata parameters.

Example embodiments described herein relate to image metadata optimization. A plurality of sets of training images and a plurality of sets of targeted values for one or more image metadata parameters are determined. Each set of targeted values in the plurality of sets of targeted values corresponds to a respective set of one or more training images in the plurality of sets of training images. A plurality of sets of image data features of one or more selected image data feature types is extracted from the plurality of sets of training images. Each set of image data features in the plurality of sets of image data features corresponds to a respective set of one or more training images in the plurality of sets of training images. The plurality of sets of image data features of the one or more selected image data feature types and the plurality of sets of targeted values for the one or more image metadata parameters are applied to training one or more prediction models for optimizing the one or more image metadata parameters. The one or more prediction models are to generate one or more optimized values for the one or more image metadata parameters for one or more non-training images. The one or more optimized values for the one or more image metadata parameters are caused to be used in rendering the one or more non-training images.

Example Video Delivery Processing Pipeline

Figure 1:
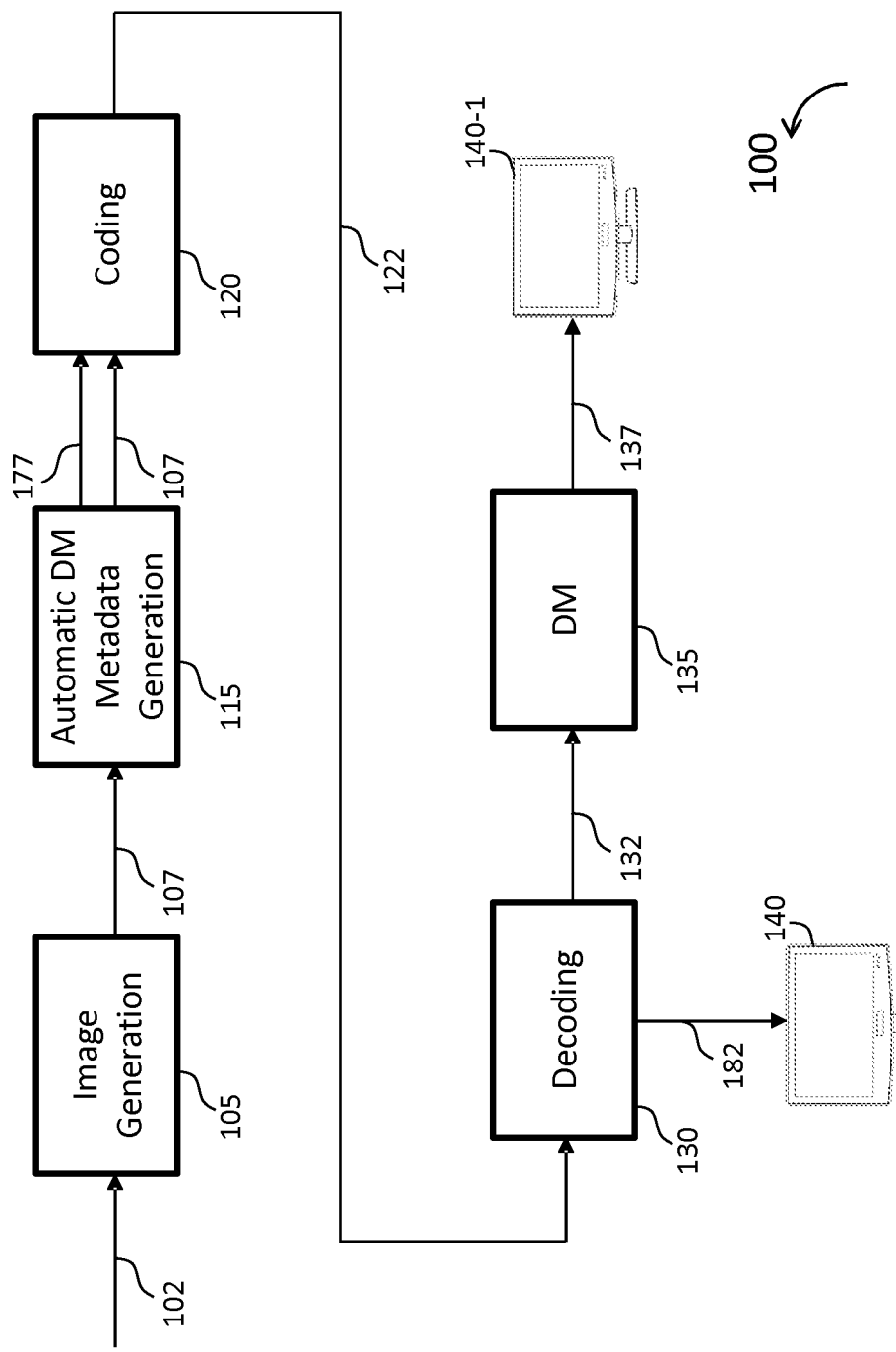
FIG. 1 depicts an example process of a video delivery pipeline.

FIG. 1 depicts an example process of a video delivery pipeline (100) showing various stages from video capture/generation to an HDR or SDR display. Example HDR displays may include, but are not limited to, image displays operating in conjunction with gaming devices, HDR TVs, mobile devices, home theaters, etc. Example SDR displays may include, but are not limited to, SDR TVs, mobile devices, home theaters, etc.

Video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide the video data (107). In some embodiments, the video data (107) may be (e.g., automatically with no human input, manually, automatically with human input, etc.) edited into a sequence of images before being passed to the next processing stage/phase in the video delivery pipeline (100).

The video data (107) may include SDR or HDR video contents such as gaming video contents, SDR+ video content, etc., as well as image metadata that may be used by recipient devices downstream in the video delivery pipeline (100) to perform image processing operations on a decoded version of the SDR or HDR video contents.

Example HDR video contents may, but are not necessarily limited to only, be HDR images related to video gaming, etc. Example SDR video contents may, but are not necessarily limited to only, be SDR+ video contents, SDR images, SDR movie releases, SDR+ images, SDR media programs, etc.

As used herein, the term "SDR+" denotes a combination of SDR image data and metadata, which when combined together allow generating corresponding HDR image data. SDR+ metadata may include data to generate a backward reshaping function which when applied to an input SDR image generates a corresponding HDR image. SDR+ images allow backwards compatibility with legacy SDR displays which can ignore the SDR+ metadata and simply display the SDR image.

Image metadata transmitted with HDR video contents and/or SDR video contents to a recipient device may also include DM metadata generated under techniques described herein. The DM metadata can be used to perform DM operations for generating display images from HDR images in the HDR video contents and/or the generated HDR images from backward reshaping SDR images in the SDR video contents.

By way of illustration but not limitation, the video data (107) (e.g., after editing, etc.) is provided to a processor for automatic DM metadata generation (115). The automatic DM metadata generation (115) may include performing automatic generation of DM metadata with no or little human interaction. The automatically generated DM metadata can be used by recipient device to adjust or modify colors or brightness of an image (e.g., an SDR image, an HDR image, etc.) in the video data (107) to enhance the image quality or achieve a particular appearance for the image. The automatic DM metadata generation (115) may serve the function of (e.g., entirely, partially, etc.) some or all of a colorist's manual operations known as "color timing" or "color grading." Thus, instead of using intensive, manual colorist operations, the automatic DM metadata generation (115) under techniques as described herein can automatically (e.g., with no colorist input, with no user input, etc.) generate the DM metadata for the video data (107).

Coding block (120) receives the video data (107), the automatically generated DM metadata (177), and other image metadata; and encodes the video data (107) with the automatically generated DM metadata (177), the other image metadata, etc., into a coded bitstream (122). Example coded bitstreams may include, but are not necessarily limited to, a single layer video signal, etc. In some embodiments, the coding block (120) may comprise audio and video encoders, such as those defined by ATSC, DVB, DVD, Blu-Ray, and other delivery formats, to generate the coded bitstream (122).

The coded bitstream (122) is then delivered downstream to receivers such as game devices, decoding and playback devices, media source devices, media streaming client devices, television sets (e.g., smart TVs, etc.), set-top boxes, movie theaters, and the like. In a receiver (or a downstream device), the coded bitstream (122) is decoded by decoding block (130) to generate decoded images 182, which may be similar to or the same as the images (e.g., SDR images, HDR images, etc.) represented in the video data (107) subject to quantization errors generated in compression performed by the coding block (120) and decompression performed by the decoding block (130).

In a non-limiting example, the video signal represented in the coded bitstream (122) may be an HDR video signal, for example encoded with gaming video content and image metadata including but not limited to the automatically generated DM metadata (177). The automatically generated DM metadata (177) can be used by the downstream decoders (or client-side devices operating in conjunction with the decoders) to perform display management operations on HDR images decoded from the coded bitstream (122) to generate display images optimized for rendering on HDR display devices, which may or may not have display capabilities comparable to the reference HDR display device for which the HDR images were optimized a video encoder that includes the coding block (120).

In another non-limiting example, the video signal represented in the coded bitstream (122) may be a backward compatible SDR video signal (e.g., an SDR+ video signal, etc.). Here, a "backward compatible video signal" may refer to a video signal that carries SDR images that are optimized for SDR displays.

In some embodiments, the coded bitstream (122) outputted by the coding block (120) may represent an output SDR video signal (e.g., an SDR+ video signal, etc.) embedded with image metadata including but not limited to backward reshaping metadata (or composer metadata), inverse tone mapping metadata, inverse DM metadata, etc., the automatically generated DM metadata (177), etc. The backward reshaping metadata comprises backward reshaping mappings that can be used by the downstream decoders to perform backward reshaping on SDR images (e.g., SDR+ images, etc.) decoded from the coded bitstream (122) in order to generate backward reshaped images for rendering on an HDR reference display. In some embodiments, the backward reshaped images may be generated from the decoded SDR images using one or more SDR-to-HDR conversion tools implementing backward reshaping mappings (or inverse tone mappings) based at least in part on the backward reshaping metadata.

A used herein, backward reshaping refers to image processing operations that convert re-quantized images back to the original EOTF domain (e.g., gamma, PQ, hybrid log gamma or HLG, etc.), for further downstream processing, such as the display management. Example backward reshaping operations are described in U.S. Provisional Application Ser. No. 62/136,402, filed on Mar. 20, 2015, (also published on Jan. 18, 2018, as U.S. Patent Application Publication Ser. No. 2018/0020224), the entire contents of which are hereby incorporated by reference as if fully set forth herein.

Additionally, optionally, or alternatively, the automatically generated DM metadata (177) in the image metadata can be used by the downstream decoders to perform display management operations on the backward reshaped images generate display images (e.g., HDR display images, etc.) optimized for rendering on the HDR reference display devices, or other display devices such as non-reference HDR display devices, etc.

In operational scenarios in which the receiver operates with (or is attached to) a target display 140 that supports the standard dynamic range or a relatively narrow dynamic range comparable with or less than the standard dynamic range AND the decoded images (182) are SDR images, the receiver can render the decoded SDR images directly or indirectly on the target display (140).

In operational scenarios in which the receiver operates with (or is attached to) an HDR target display 140-1 that supports a high dynamic range (e.g., 400 nits, 1000 nits, 4000 nits, 10000 nits or more, etc.) AND the decoded images (182) are SDR images, the receiver can extract the composer metadata from (e.g., the metadata container in, etc.) the coded bitstream (122) and use the composer metadata to compose HDR images (132), which may be backward reshaped images generated from backward reshaping the SDR images based on the composer metadata. In addition, the receiver can extract the automatically generated DM metadata from the coded bitstream (122) and apply DM operations (135) on the HDR images (132) based on the automatically generated DM metadata to generate display images (137) optimized for rendering on the HDR target display device (140-1) and render the display images (137) on the HDR target display device (140-1).

In operational scenarios in which the receiver operates with (or is attached to) an HDR target display 140-1 that supports a high dynamic range (e.g., 400 nits, 1000 nits, 4000 nits, 10000 nits or more, etc.) AND the decoded images are HDR images (e.g., 132 of FIG. 1, gaming video contents, etc.), the receiver can extract the automatically generated DM metadata from the coded bitstream (122) and apply DM operations on the HDR images (132) based on the automatically generated DM metadata to generate display images (137) optimized for rendering on the HDR target display device (140-1) and render the display images (137) on the HDR target display device (140-1).

Feature Selection, Feature Pruning and Prediction Model Selection

Picture qualities of images can be significantly improved based on image metadata generated by a colorist with manual input. However, colorist operations can be very time consuming and can only be performed in offline in most if not all circumstances. Techniques as described herein can be used to automatically generate display management metadata (including but not limited to L2 metadata, metadata parameters per an industry standard such as ACES, metadata parameters per a proprietary specification/design, etc.), which is equivalent to or simulates colorist generated image metadata, for the purpose of improving picture qualities of images with no or little colorist input. As used herein, the term "L2 metadata" provides and/or describes information about video characteristic adjustments that are originated from, or traced back to, adjustments made by a director, a color grader, a video professional, etc., in a production studio with reference display with a reference dynamic range. Metadata S, O, and P are each examples of L2 or "trim-pass" metadata. For example, given input Yi, and SOP metadata, the output of a trim-pass may be expressed as $f_{trim}(Y_i)=(S \cdot Y_i+O)^P$.

Training and test data used by the techniques as described herein may be stored in a data repository such as a training and test database. In some embodiments, the training and test database may comprise a plurality of HDR images (e.g., 3600 EDR images, etc.) and L2 metadata (for improving image qualities of the plurality HDR images) generated by colorists through color timing or grading. By way of example but not limitation, the L2 metadata may be represented out of band, or stored separately in the database, from the HDR images in XML files.

In some embodiments, the training and test database may include thousands, tens of thousands, etc., of image frames. The training data (or training dataset) may include a relatively high percentage such as 75%, 80%, 90%, etc., of all the image frames, whereas the test data (or test dataset) may include the remaining of all the image frames exclusive of the images in the training data.

Automatic prediction methods/algorithms/procedures/models may be trained based on the training data (in the training and test database) comprising the HDR images and targeted image metadata (serving as ground truth or labels) such as the L2 metadata in the XML files. The automatic DM metadata/parameter prediction as described herein includes selections of prediction model(s) and image data features (e.g., complete image data features, pruned image data features, etc.) to be applied to training the prediction model(s). Example image data features incorporated in a prediction model (or applied to training the prediction model) as described herein may include, but are not necessarily limited to only, 3D (color) histogram. A wide variety of different prediction (regression) algorithms can be used. Example prediction algorithms to be implemented with a prediction model as described herein may include, but are not necessarily limited to only, any of: parametric prediction methods such as generalized linear prediction (GLM), neural network regression (NNR), etc.; non-parametric prediction method such as Gaussian process regression (GPR); etc.

For gaming applications in which HDR images are available for encoding into a coded bitstream (e.g., 122 of FIG. 1, etc.), prediction algorithms can be applied to directly predict L2 metadata/parameters for the HDR mages.

For display applications in which HDR images are not directly available but SDR images (e.g., SDR images plus composer metadata, etc.) such as SDR+ images are directly available for encoding into a coded bitstream (e.g., 122 of FIG. 1, etc.), converting the SDR images to corresponding HDR images by backward reshaping for example, for training, testing and/or prediction with prediction model(s) is computationally intensive. Techniques as described herein can be used to avoid, or minimize the use of, such SDR-HDR image conversion operations. One or more different approaches/methods such as feature transfer, reverse mapping, and so forth, can be used to predict L2 metadata/parameters from the SDR domain in which available images are represented.

Figure 2A:
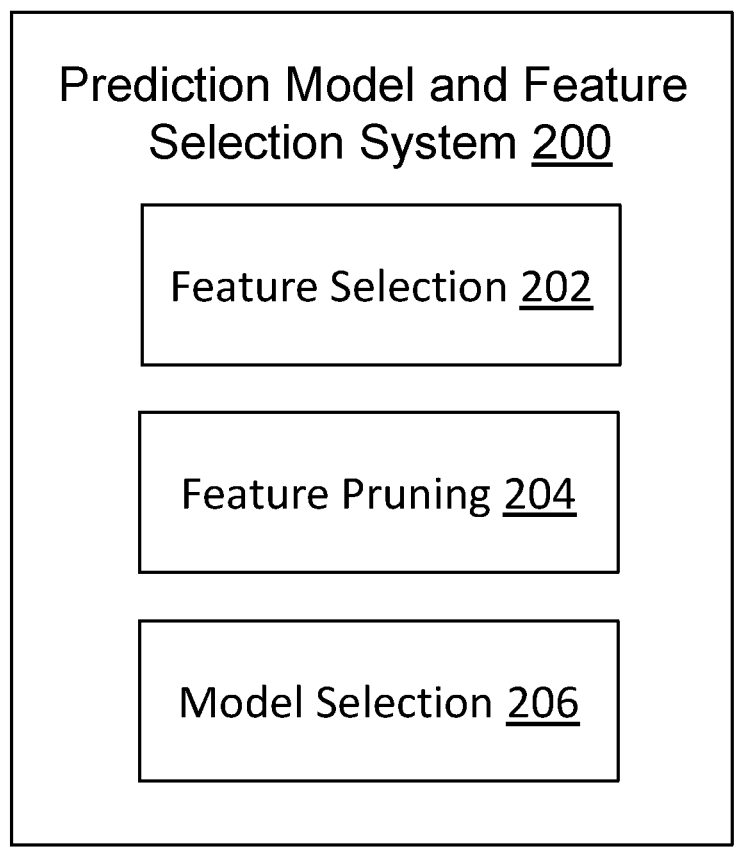
FIG. 2A illustrates an example prediction model and feature selection system.

FIG. 2A illustrates an example prediction model and feature selection system 200 for feature selection, feature pruning and prediction model selection. This system (200) may operate separately but in conjunction with the video deliver pipeline (100). Additionally, optionally or alternatively, the system (200) may be implemented as a part of the video delivery pipeline (100). The system (200) may be implemented by one or more computing processors such as one or more of: video encoders, video codecs, video decoders, video transcoders, video streaming servers, gaming machines, video broadcast servers, etc. In some embodiments, the system (200) comprises some or all of three main system blocks or stages.

In the first block or stage (202), candidate image data features used for predictions are selected. Example candidate image data features may include, but are not necessarily limited to only, any of: one-dimensional (1D) histograms (e.g., 128 bins, luma histogram, chroma histogram, etc.), raw linear histograms (e.g., linear intensity/luma values, etc.), log histograms (e.g., logarithmic intensity/luma values, etc.), binary histograms (e.g., 0 for a bin with zero pixel count and 1 for a bin with non-zero pixel count, e.g., 0 for a bin with a pixel count below a pixel count threshold and 1 for a bin with a pixel count not below the pixel count threshold, etc.), three-dimensional (3D) histograms (e.g., 163, 323 bins/cubes of luma and/or chroma codeword, etc.), standard deviations in luma domain, color saturation in luma domain, luma-chroma combined 1D histograms, and so forth.

In the second block or stage (204), less-effective features are pruned out of the candidate image data features to reduce dimensions involved in prediction thus to reduce computation costs. In some embodiments, raw data used to compute candidate features may be pre-processed, aggregated, pruned and/or reduced. Low occurrence features may be removed as some or all of the less-effective features from the candidate image data features identified in the first stage (202). Transformations may be performed on training image data and/or a derived version thereof to generate features in transform domain(s) for the purpose of reducing dimensionality in the prediction. Principal component analysis (PCA) may be performed on the candidate features for the purpose of reducing dimensionality in the prediction.

In the third block or stage (206), one or more prediction methods are then performed based on final selected features from the candidate image data features after the less-effective features are pruned. The one or more prediction methods may be selected from a wide variety of prediction methods such as any combination of: parametric prediction methods such as generalized linear prediction (GLM), neural network regression (NNR), etc.; non-parametric prediction method such as Gaussian process regression (GPR); etc.

A prediction method/algorithm/procedure/model as described herein may be applied to predicting values of a given DM metadata parameter (e.g., one of SOP parameters, where S stands for slope used to adjust a tone mapping curve/function, O stands for offset used to adjust the curve/function, P stands for power used to adjust the curve/function, etc.). The performance in predicting the values of the DM metadata parameter can be measured by a correlation by two input vectors a and b respectively representing colorist manually generated values of the DM metadata parameter and the predicted values of the DM metadata parameter.

More specifically, input vector a comprises vector components (denoted as $a_i$, where i is an integer between 1 and N) representing respective colorist manually generated values (e.g., labels, ground truths, etc.) of the DM metadata parameter for N test images available from the test data in the training and test database.

Input vector b comprises vector components (denoted as $b_i$, where i is an integer between 1 and N) representing respective predicted values of the same DM metadata parameter for N test images available from the test data in the training and test database.

The correlation, denoted as ρ(a, b), by the input vectors a and b may be given as follows:

$$\rho(a,b) = \frac{1}{N-1}\sum_{i=1}^{N}\left(\frac{a_i - \mu_A}{\sigma_A}\right)\left(\frac{b_i - \mu_B}{\sigma_B}\right) \quad (1)$$

where $\mu_A$ and $\sigma_A$ represent the average and standard deviation in the colorist manually generated values of the DM metadata parameter as represented by the input vector a; where $\mu_B$ and $\sigma_B$ represent the predicted average and the predicted standard deviation of the DM metadata parameter as represented by the input vector b.

From the system blocks or stages (202-206) of the prediction model and feature selection system (200) as illustrated in FIG. 2A, an optimal combination of (e.g., final, intermediate, etc.) selected features and prediction method(s) (e.g., selected based on the performance as determined through correlations with the colorist manually generated values, etc.) may be determined. Example optimal combination may include, but are not necessarily limited to, some or all of: 3D log histogram (e.g., 323 bins, log 10 domain, etc.) with low occurrence bins/cubes (e.g., pixel count <1000, etc.) removed, a GPR-based prediction method/algorithm/process, and so forth.

For example, image data features such as the 3D histogram in log 10 domain can be found to achieve better prediction results than many other image data features under consideration in many non-limiting embodiments. Using high occurrence (e.g., selecting bins/cubes with high occurrences above occurrence threshold(s), etc.) to reduce dimension can also be found to be slightly more effective than PCA. Using a relatively large number of cubes (e.g., 300, 400, etc.) from the 3D histogram can result in slightly better results than using a relatively small number of cubes from the 3D histogram. As compared with other prediction methods/algorithms/processes, a GPR-based prediction method/algorithm/process produces automatically generated DM parameter values with relatively high correlation with DM parameter values manually generated by colorist(s). For instance, in comparison, NNR with relatively small-size training and test data produces automatically generated DM parameter values with relatively low correlation (e.g., below 0.5, etc.) with the colorist manually generated DM parameter values.

By way of illustration but not limitation, feature selection, dimension reduction and feature pruning, prediction training, and so forth, may be described with one or more example optimal combinations, which may include but are not necessarily limited to, any of: 3D cube histogram(s) and/or luma-chroma combined 1D histograms as selected features for prediction, high frequency cube selection as a dimension reduction method, GPR as optimal prediction models, etc.

Selection of image data features for the estimation/prediction of L2 metadata/parameters may be made based on the efficiency of feature vector computation and prediction accuracy with respect to the image data features. In the present example, the 3D Histogram and/or luma-chroma combined 1D histograms can serve as reliable image data features for training the GPR models as follows.

Single Image Metadata/Parameter Prediction

In some embodiments, a sequence of 3D histogram may be generated/derived for a sequence of input images (or image frames) in an input 3-color-component (or -channel) video signal by partitioning the input video signal or the input images therein into M bins in each dimension (e.g., each color component, each color channel, etc.) of a color space. Each 3D histogram in the sequence of 3D histograms may correspond to, or may be generated for, a respective input image in the sequence of input images. Here, M is a positive integer representing a total number of subdivisions (or 1D bins) in a 3D histogram as described herein for each such dimension (e.g., each such color component, each such color channel, etc.) of the color space. Each 3D histogram may be made of $M^3$ cubes (or 3D bins) in total.

In a training phase of the prediction models, the input video signal may represent a training video signal comprising a sequence of training images/frames as the sequence of input images as previously mentioned. In a test phase of the prediction models, the input video signal may represent a test video signal comprising a sequence of test images/frames as the sequence of input images as previously mentioned. In a application phase of the prediction models, the input video signal may represent a to-be-predicted video signal comprising a sequence of images/frames as the sequence of input images as previously mentioned to be predicted based on the trained and tested prediction models.

In various embodiments, the prediction models under techniques as described herein may be trained and/or tested offline, trained and/or tested beforehand, trained and/or tested while the prediction models are being applied to non-training-non-test input images, etc.

By way of example but not limitation, the 3 color components (or color channels) of the color space in which pixel values of an image (or image frame) comprise a luma color component (or luma color channel) denoted as "y" and two chroma color components (or chroma color components) denoted as "c0" and "c1".

For the purpose of illustration only, the sequence of input images comprises F input images (e.g., training images, test images, to-be-predicted images, etc.), where F is a positive integer representing a total number of input images in the sequence of input images.

The $i^{th}$ pixel value of the $j^{th}$ image ($v_{ji}^{y}$, $v_{ji}^{c0}$, $v_{ji}^{c1}$) may be mapped to a cube with an index ($\alpha_{ji}$, $\beta_{ji}$, $\gamma_{ij}$), in which $$\alpha_{ji} = \text{round}\left(\frac{v_{ji}^{y}}{M}\right), \beta_{ji} = \text{round}\left(\frac{v_{ji}^{c0}}{M}\right), \text{and } \gamma_{ji} = \text{round}\left(\frac{v_{ji}^{c1}}{M}\right) \quad (2)$$

Each 3D cube in the j-th 3D histogram (denoted as $h_j^y(\alpha, \beta, \gamma)$) is a triplet representing a specific cubic range for the input pixel values which, after modulo or quantized with M, may be used as an index for each such 3D cube of the j-th image in the F images. Denote the total number of pixels in an image as P. Pixels of the j-th image in the F images available from the training and test database may be counted into their corresponding 3D cubes in the j-th 3D histogram based on pixel values (as represented in the j-th image) for the pixels.

An example procedure/method used to generate the 3D histograms and 3D cubes therein is illustrated in TABLE 1 below. For the purpose of illustration only, it has been described that a 3D histogram can be frame-based. For instance, a 3D histogram such as the j-th 3D histogram can be built from a corresponding j-th image. It should be noted that, in other embodiments, a 3D histogram may not be frame-based. For example, a 3D histogram can be scene-based (a 3D histogram such as the j-th 3D histogram can be built from a set of images representing a corresponding j-th scene) depending on whether an individual image/frame or an individual (e.g., entire, etc.) scene should be trained, tested and/or predicted.

TABLE 1

// initialization
$h_j^y(\alpha, \beta, \gamma) = 0$ for all cube index ($\alpha, \beta, \gamma$) for each frame j
// scan for each pixel
for each frame j
   for each pixel i in input signal
      find bin index for value $(v_{ji}^y, v_{ji}^{c0}, v_{ji}^{c1})$ as $\alpha, \beta, \gamma$ $$\alpha_{ji} = \text{round}\left(\frac{v_{ji}^y}{M}\right), \beta_{ji} = \text{round}\left(\frac{v_{ji}^{c0}}{M}\right), \text{ and } \gamma_{ji} = \text{round}\left(\frac{v_{ji}^{c1}}{M}\right)$$

$h_j^y(\alpha, \beta, \gamma)$ ++
   end
end

An example procedure/method used to generate the 3D histograms and 3D cubes therein in the log 10 domain is illustrated in TABLE 2 below.

TABLE 2

// scan for each pixel
for each frame j
   for each cube ($\alpha, \beta, \gamma$)
      $h_j^y(\alpha, \beta, \gamma) = \log10(h_j^y(\alpha,\beta,\gamma) + 1)$;
   end
end A sequence of luma-chroma combined 1D histograms can also be built for the same F images by cascading 1D histograms for luma and chroma channels instead of, or in addition to, computing the 3D histograms. Each luma-chroma combined 1D histogram in the sequence of luma-chroma combined 1D histograms may correspond to, or may be generated for, a respective input image in the sequence of input images.

The luma channel (e.g., of an image, of a scene, etc.) may be partitioned into $M_y$ bins. Two chroma channels (e.g., of an image, of a scene, etc.) may be partitioned into $M_{c0}$ and $M_{c1}$ bins respectively. The $i^{th}$ pixel value $(v_{ji}^y, v_{ji}^{c0}, v_{ji}^{c1})$ of the $j^{th}$ image will be mapped to the bins with index ($\alpha_{ji}, \beta_{ji}, \gamma_{ij}$), as follows:

$$\alpha_{ji} = \text{round}\left(\frac{v_{ji}^y}{M_y}\right), \beta_{ji} = \text{round}\left(\frac{v_{ji}^{c0}}{M_{c0}}\right), \text{ and } \gamma_{ji} = \text{round}\left(\frac{v_{ji}^{c1}}{M_{c1}}\right) \quad (3)$$

Three separate 1D histograms (one for each color channel) can be first built by counting the number of pixels in each bin, and then combined or cascaded into a luma-chroma combined 1D histogram.

An example procedure/method used to generate the luma-chroma combined 1D histograms (denoted as $h_j^{y,c0,c1}(\bullet)$) and 1D bins therein is illustrated in TABLE 3 below. For the purpose of illustration only, it has been described that a luma-chroma combined 1D histogram can be frame-based. For instance, a luma-chroma combined 1D histogram such as the j-th luma-chroma combined 1D histogram can be built from a corresponding j-th image. It should be noted that, in other embodiments, a luma-chroma combined 1D histogram may not be frame-based. For example, a luma-chroma combined 1D histogram can be scene-based (a luma-chroma combined 1D histogram such as the j-th luma-chroma combined 1D histogram can be built from a set of images representing a corresponding j-th scene) depending on whether an individual image/frame or an individual (e.g., entire, etc.) scene should be trained, tested and/or predicted.

TABLE 3

// initialization
$h_j^y(\alpha) = 0$, $h_j^{c0}(\beta) = 0$ and $h_j^{c1}(\gamma) = 0$ for all bin index ($\alpha, \beta, \gamma$)
for each frame j
// scan for each pixel
for each frame j
   for each pixel i in input signal
      find bin index for value $(v_{ji}^y, v_{ji}^{c0}, v_{ji}^{c1})$ as $\alpha_{ji}, \beta_{ji}, \gamma_{ji}$ $$\alpha_{ji} = \text{round}\left(\frac{v_{ji}^y}{M_y}\right), \beta_{ji} = \text{round}\left(\frac{v_{ji}^{c0}}{M_{c0}}\right), \text{ and } \gamma_{ji} = \text{round}\left(\frac{v_{ji}^{c1}}{M_{c1}}\right)$$

$h_j^y(\alpha)$ ++ ; $h_j^{c0}(\beta)$ ++ ; $h_j^{c1}(\gamma)$ ++
   end
   $h_j^{y,c0,c1} = [h_j^y(\alpha), h_j^{c0}(\beta), h_j^{c1}(\gamma)]$;
end Individual 3D cubes in the 3D histogram and individual 1D bins in the luma-chroma combined 1D histograms represent candidate features for prediction. However, some candidate features or some underlying 3D cubes and some 1D bins may be insignificant compared with some other candidate features or some other underlying 3D cubes and some other 1D bins. Removing insignificant features helps reduce dimensions of feature vectors to be constructed for training, testing, prediction, etc.

In some implementation examples, as the total number of dimensions in luma-chroma combined 1D histogram features is much smaller than that of the 3D histograms. Dimensionality reduction may or may not be performed to identify and remove insignificant candidate features or underlying 1D bins from the feature vectors for prediction.

An example procedure for dimensionality reduction in the 3D histograms is illustrated in TABLE 4 below. In the procedure, 3D cubes (or candidate features) with pixel counts no larger than a pixel count threshold δ are removed from being used to construct the features vectors for prediction, whereas 3D cubes (or candidate features) with pixel counts larger than the pixel count threshold δ are used to construct the features vectors for prediction.

TABLE 4

K = 0   // counter
H = { }   // valid collection
for each cube ($\alpha, \beta, \gamma$)
// collect all histogram in this cube from the database $$h^y(\alpha, \beta, \gamma) = \sum_{j=0}^{F-1} h_j^y(\alpha, \beta, \gamma)$$

// only significant amount of pixel count will be used in the regression
if( $h^y(\alpha, \beta, \gamma) > \delta$ )
   H = H ∪ ($\alpha, \beta, \gamma$)
   K ++ ;

TABLE 4-continued

```
        end
    end
end
```

Through the procedure as illustrated in TABLE 4 above, a set denoted H is generated to include a plurality of respective indexes for a plurality of selected cubes (in the 3D histograms) with pixels counts greater than the pixel count threshold δ index. The total number of selected cubes as identified by the plurality of respective indexes is K. Let H(n) be the $n^{th}$ element in set H.

In a training phase of a GPR-based prediction model, feature vectors/matrixes may be generated based on image features such as selected 3D cubes in 3D histograms as described herein. Additionally, optionally or alternatively, other image data features such as 1D bins in luma chroma combined 1D histograms and the like may be incorporated into the feature vectors/matrixes.

By way of example but not limitation, the GPR-based prediction model is used to predict L2 parameter (in L2 metadata) such as a power parameter P in SOP parameters in L2 metadata. Example general descriptions of Gaussian processes and GPR-based prediction model can be found in C. E. Rasmussen & C. K. I. Williams, "Gaussian Processes for Machine Learning," (the MIT Press 2006), which is incorporated herein by reference in its entirety.

Denote the predicted power parameter as $\hat{L}_{2,j}^{(P)}$, and the observed power parameter as $L_{2,j}^{(P)}$, where j represents a frame index identifying the j-th image/frame in the F images/frames (e.g., training images, etc.), and where the subscript 2 identifies this parameter as a part of L2 metadata. The observed power parameter $L_{2,j}^{(P)}$ represents a targeted observation such as a colorist manually generated power parameter (value) for the j-th image/frame in the F images/frames.

An example procedure for generating an input (feature) matrix denoted as X comprising feature vectors and a targeted observation vector comprising targeted observations for the power parameters for the F (training) images/frames is illustrated in TABLE 5 below.

TABLE 5

```
X = 0_{K×F}  // initialize training input matrix
y = 0_F  // initialize training targeted observation vector
for each frame j among F-frame database
    // for input matrix
    for k = 0 : 1 : K-1
        use index k to find corresponding (α,β,γ) from H.
        X[k, j] = h_j^y (α, β, γ) // denote x_{k,j} = X[k, j]
    end
    // for observation
    y[j] = L_{2,j}^{(P)} // L2 power parameter in frame j
end
```

Denote the feature vector, which is the $j^{th}$ column of the feature matrix X as illustrated in TABLE 5 above and comprises features extracted from the j-th image/frame, as $x_j$.

The optimization goal for the prediction model is to minimize the total difference between the original or targeted L2 parameter $L_{2,j}^{(P)}$ and the predicted L2 parameter $\hat{L}_{2,j}^{(P)}$.

A Gaussian process may be defined as a collection of random variables (to a real function denoted as ƒ(x)), any finite number of which has/have a (e.g., joint, etc.) Gaussian distribution. The Gaussian process is completely specified by its mean function (denoted as m(x)) and covariance function (denoted as r(x, x')) of the real process ƒ(x) as follows:

$$m(x) = E[f(x)] \qquad (4)$$

$$r(x,x') = E[(f(x)-m(x))(f(x')-m(x'))] \qquad (5)$$

$$f(x) \sim GP(m(x), r(x,x')) \qquad (6)$$

Let $f_p = f(x_p)$ as the random variable corresponding to the case $(x_p, y_p)$ as would be expected. The consistency/marginalization requirement in the Gaussian process is: if $(y_1, y_2) \sim N(\mu, \Sigma)$, then $(y_1) \sim N(\mu_1, \Sigma_{11})$, where $\Sigma_{11}$ is the relevant submatrix of Σ. In other words, examination of a larger set of variables does not change the distribution of the smaller set.

The foundation of the GPR-based prediction model is based on a selected covariance function (or kernel), $r(\hat{x}, x_q)$. For illustration purposes only, the selected covariance function takes the form of a rational quadratic (RQ) as follows:

$$r(x_p, x_q) = \sigma_f^2 \left(1 + \frac{\sum_{k=0}^{K-1}(x_{p,k} - x_{q,k})^2}{2\alpha l^2}\right)^{-\alpha} \qquad (7)$$

where hyperparameter $(\sigma_f, \alpha, l)$ can be found via the optimization procedure.

A covariance matrix for the GPR-based prediction model can be constructed as follows:

$$R(X, X) = \begin{bmatrix} r(x_0, x_0) & r(x_0, x_1) & \cdots & r(x_0, x_{F-1}) \\ r(x_1, x_0) & r(x_1, x_1) & \cdots & r(x_1, x_{F-1}) \\ \vdots & \vdots & & \vdots \\ r(x_{F-1}, x_0) & r(x_{F-1}, x_1) & \cdots & r(x_{F-1}, x_{F-1}) \end{bmatrix} \qquad (8)$$

For the noise free case, $\{(x_p, f_p) | p=1, \ldots, F\}$, the joint distribution of training outputs f, and test outputs denoted as f* may be given as follows:

$$\begin{bmatrix} f \\ f_* \end{bmatrix} \sim N\left(0, \begin{bmatrix} R(X, X) & R(X, X_*) \\ R(X_*, X) & R(X_*, X_*) \end{bmatrix}\right) \qquad (9)$$

The joint Gaussian prior distribution on the observations (e.g., targeted power parameters from colorist manually generated values, etc.) to give rise to the test outputs f* may be given as follows:

$$f_* | X_*, X, f \sim N(R(X_*, X) R(X, X)^{-1} f, R(X_*, X_*) - R(X_*, X) R(X, X)^{-1} R(X, X_*)) \qquad (10)$$

For the noisy case with noise $\sigma_n^2$, the joint distribution of training outputs f, and test outputs denoted as f* may be given as follows:

$$\begin{bmatrix} y \\ f_* \end{bmatrix} \sim N\left(0, \begin{bmatrix} R(X, X) + \sigma_n^2 I & R(X, X_*) \\ R(X_*, X) & R(X_*, X_*) \end{bmatrix}\right) \qquad (11)$$

The predictive value from GPR may be given as follows:

$$f_*|X_*,X,y \sim N(\bar{f}_*, \text{cov}(f_*)) \quad (12)$$

where $$\bar{f}_* = R(X_*,X)[R(X,X)+\sigma_n^2 I]^{-1} y \quad (13)$$

$$\text{cov}(f_*) = R(X_*,X_*) - R(X_*,X)[R(X,X)+\sigma_n^2 I]^{-1} R(X,X_*) \quad (14)$$

The prediction vector, $\bar{f}_*$, may be computed via an efficient way as follows:

$$L = \text{cholesky}(R(X,X)+\sigma_n^2 I) \quad (15)$$

$$w = L^T \backslash (L \backslash y) \quad (16)$$

$$\bar{f}_* = R(X_*,X)^T W \quad (17)$$

In practice, for the noisy data case, the covariance matrix can be directly computed based on collected data (e.g., without estimation of $\sigma_n^2$, etc.). Denote $w_q$ as the $q^{th}$ element in a set of F weighting factors w, respectively for the F (training) images.

With a new input image (e.g., a test image, a to-be-predicted image, etc.) from which features are extracted to construct a feature vector $\hat{x}$, a predicted value $\hat{y}$ (or a predicted L2 power parameter in the present example) from the GPR-based prediction model is given as follows:

$$\hat{y} = \sum_{q=0}^{F-1} w_q \cdot r(\hat{x}, x_q) \quad (18)$$

The GPR-based prediction model may be (e.g., fully, etc.) specified with a set of operational parameters such as some or all of: hyperparameters $\theta = \{\sigma_f, \alpha, 1\}$ for the kernel; F feature vectors $x_q$ each of which has K dimensions; F weighting factors $w_q$ etc.

The hyperparameters ($\sigma_f$, $\alpha$, 1) (or values thereof) have a significant impact in the performance of the GPR-based prediction, can be obtained or solved by maximizing a log of a marginal likelihood. An example marginal likelihood is given as follows:

$$p(y|X) = \int p(y|f,X) p(f|X) df \quad (19)$$

For noise free case, the log of the marginal likelihood may be given as follows:

$$\log p(f|X) = -\frac{1}{2} f^T R(X,X)^{-1} f - \frac{1}{2} \log|R(X,X)| - \frac{n}{2} \log 2\pi \quad (20)$$

For noisy case, the log of the marginal likelihood may be given as follows:

$$\log p(y|X) = -\frac{1}{2} y^T (R(X,X)+\sigma_n^2 I)^{-1} y - \frac{1}{2} \log|R(X,X)| - \frac{n}{2} \log 2\pi \quad (21)$$

The optimal solution for each of the hyperparameters as mentioned above can be obtained via solving partial derivatives of the log of the marginal likelihood as follows:

$$\frac{\partial}{\partial \theta_j} \log p(y|X,\theta) = -\frac{1}{2} y^T R(X,X)^{-1} \frac{\partial R(X,X)}{\partial \theta_j} R(X,X)^{-1} y - \frac{1}{2} tr\left(R(X,X)^{-1} \frac{\partial R(X,X)}{\partial \theta_j}\right) = \frac{1}{2} tr\left((\alpha \alpha^T - R(X,X)^{-1}) \frac{\partial R(X,X)}{\partial \theta_j}\right) \quad (22)$$

An example procedure/method used to generate a 3D histogram and 3D cubes therein from an image (e.g., a scene, etc.) for testing and/or prediction purposes is illustrated in TABLE 6 below. For the purpose of illustration only, it has been described that a 3D histogram can be frame-based. It should be noted that, in other embodiments, a 3D histogram may not be frame-based. For example, a 3D histogram can be scene-based depending on whether an individual image/frame or an individual (e.g., entire, etc.) scene should be tested and/or predicted.

TABLE 6

// initialization
$h^v(\alpha, \beta, \gamma) = 0$ for all cube index ($\alpha, \beta, \gamma$) for an input (test) image/frame
// scan for each pixel
for each pixel i in the input (test) image/frame
  find bin index for value ($v_{ji}^y$, $v_{ji}^{c0}$, $v_{ji}^{c1}$) as $\alpha, \beta, \gamma$ $$\alpha_{ji} = \text{round}\left(\frac{v_{ji}^y}{M}\right), \beta_{ji} = \text{round}\left(\frac{v_{ji}^{c0}}{M}\right), \text{ and } \gamma_{ji} = \text{round}\left(\frac{v_{ji}^{c1}}{M}\right)$$

$h_j^v(\alpha, \beta, \gamma)$ ++
end

An example procedure/method used to generate an input feature vector comprising image data features (e.g., 3D cubes in a 3D histogram, 1D bins in a luma chroma combined 1D histogram, etc.) extracted from an image (e.g., a scene, etc.) for testing and/or prediction purposes is illustrated in TABLE 7 below.

TABLE 7

$\hat{x} = 0_K$ // initialize input vector
for k= 0 : 1 : K-1
  use index k to find corresponding ($\alpha,\beta,\gamma$) from H.
  $\hat{x}_k = \lambda \cdot h^v(\alpha,\beta,\gamma)$
end As illustrated in TABLE 7 above, an adjustment factor λ can be used to take into account differences in spatial dimensions, sampling formats, etc., of images involved in training, testing and/or prediction. In some embodiments, training images may be in a 1920×10804:4:4 format and have a spatial dimension of 1920×1080 pixels in each of the training images. Thus, any test images and/or to-be-predicted images, if they have different spatial dimensions, may be scaled to the spatial dimension of 1920×1080 pixels. Additionally, optionally or alternatively, if an image is a sampling format of 4:2:0, component pixel values such as luma values may be scaled to the same dimension of other component pixel values such as chroma values, or the chroma values may be upsampled to the same dimension of the luma values.

Assuming a spatial dimension of a test image or a to-be-predicted image (e.g., after resampling, a resampled image, etc.) is W×H, then the adjustment factor 2 may be given as follows:

$$\lambda = \frac{1920 \times 1080}{W \times H} \quad (23)$$

Given the feature vector $\hat{x}$, a predicted value for the L2 power parameter may be generated from the GPR-based prediction model (or a predictor) as follows:

$$\hat{y} = \sum_{q=0}^{F-1} w_q \cdot r(\hat{x}, x_q) \quad (24)$$

where $r(\hat{x}, x_q)$ represents the predictor's kernel. An example rational quadratic (RQ) kernel $r(\hat{x}, x_q)$ for the predictor in expression (24) above is given as follows:

$$r(\hat{x}, x_q) = \sigma_f^2 \left(1 + \frac{\sum_{k=0}^{K-1}(\hat{x}_k - x_{q,k})^2}{2\alpha l^2}\right)^{-\alpha} \quad (25)$$

Multiple Parameter Prediction

A variety of multiple parameter prediction approaches can be used to predict optimal values of multiple image metadata parameters such as L2 parameters (e.g., used in trim pass operations, etc.). In a first example approach, single parameter prediction techniques (e.g., procedures, algorithms/methods, etc.) as described herein can be deployed to make prediction for each L2 parameter individually. More specifically, these techniques can be used to predict optimal values for the L2 power parameter (e.g., L2 power parameter $L_2^{(P)}$, parameters used in trim pass operations, etc.), as well as to predict optimal values for other L2 parameters (e.g., L2 slope parameter $L_2^{(S)}$, L2 offset parameter $L_2^{(O)}$, used in trim pass operations, etc.).

Example trim pass operations are described in U.S. Patent Application Publication No. 2018/0007356, published on Jan. 4, 2018, the entire contents of which are hereby incorporated by reference as if fully set forth herein.

In a second example approach of predicting for multiple image metadata parameters, a (e.g., final trim-pass, target, etc.) tone mapping curve may be predicted first. Once the (e.g., final trim-pass, target, etc.) tone mapping curve is predicted, trim-pass parameters such as L2 parameters can be predicted from the tone mapping curves with and without trimming Multiple Parameter Prediction Through Individual Parameter Predictions A straightforward way to predict multiple image metadata parameters such as the three L2 parameters (e.g., SOP, etc.) is to deploy multiple different predictors each of which may be optimized through individual training. For example, each of the three L2 parameter (e.g., SOP, etc.) can be predicted with a respective predictor in three individual predictors $\{\hat{y}^{(S)}, \hat{y}^{(O)}, \hat{y}^{(P)}\}$ that are optimized through individual training. Kernels for these individually trained predictors can share the same distance measurement; however, each of the predictors can have different kernel parameters and weighting factors, as follows:

$$\hat{L}_2^{(S)} = \sum_{q=0}^{F-1} w_q^{(S)} \cdot r^{(S)}(\hat{x}, x_q) \quad (26\text{-}1)$$

$$\hat{L}_2^{(O)} = \sum_{q=0}^{F-1} w_q^{(O)} \cdot r^{(O)}(\hat{x}, x_q) \quad (26\text{-}2)$$

$$\hat{L}_2^{(P)} = \sum_{q=0}^{F-1} w_q^{(P)} \cdot r^{(P)}(\hat{x}, x_q) \quad (26\text{-}3)$$

where $$r^{(S)}(\hat{x}, x_q) = \sigma_f^{(S)2}\left(1 + \frac{\sum_{k=0}^{K-1}(\hat{x}_k - x_{q,k})^2}{2\alpha^{(S)}l^{(S)2}}\right)^{-\alpha(S)} \quad (27\text{-}1)$$

$$r^{(O)}(\hat{x}, x_q) = \sigma_f^{(O)2}\left(1 + \frac{\sum_{k=0}^{K-1}(\hat{x}_k - x_{q,k})^2}{2\alpha^{(O)}l^{(O)2}}\right)^{-\alpha(O)} \quad (27\text{-}2)$$

$$r^{(P)}(\hat{x}, x_q) = \sigma_f^{(P)2}\left(1 + \frac{\sum_{k=0}^{K-1}(\hat{x}_k - x_{q,k})^2}{2\alpha^{(P)}l^{(P)2}}\right)^{-\alpha(P)} \quad (27\text{-}3)$$

This overall multi-parameter GPR-based prediction model as represented by the individually trained predictors comprises operational parameters such as hyperparameters—e.g. $\theta = \{\sigma_f^{(S)}, \alpha^{(S)}, l^{(S)}, \sigma_f^{(O)}, \alpha^{(O)}, l^{(O)}, \theta_f^{(P)}, \alpha^{(P)}, l^{(P)}\}$—for the overall kernel with three individual kernels, feature vectors $\{x_q\}$ each of which has K dimensions (e.g., F feature vectors each of K dimensions, etc.), weighting factors $\{w_q^{(s)}\}, \{w_q^{(o)}\}$, and $\{w_q^{(p)}\}$ (e.g., 3×F weighting factors, etc.).

Figure 3A:
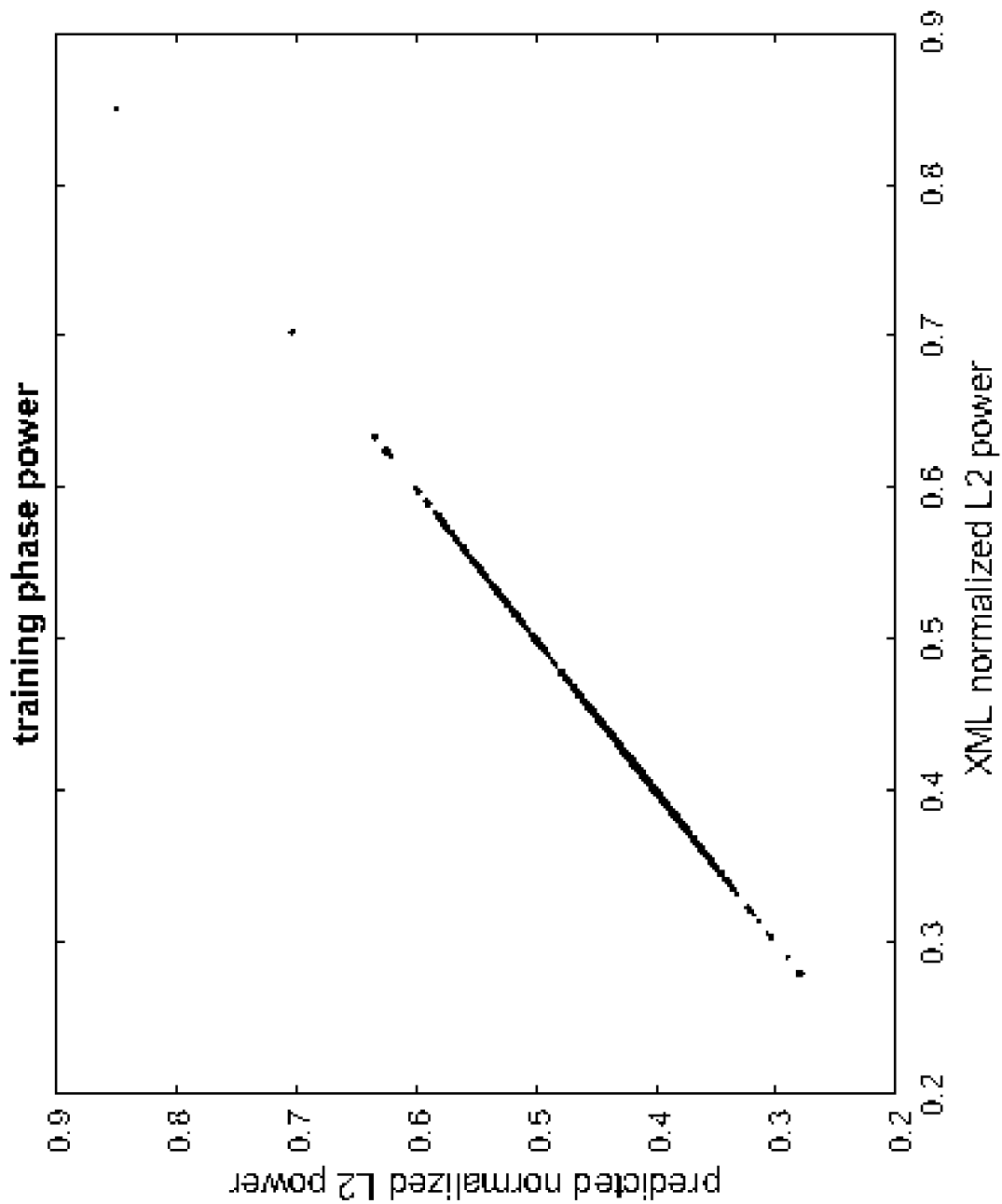
FIG. 3A and FIG. 3B depict correlations between predicted values of a L2 parameter and corresponding colorist manually generated values of the same L2 parameter in prediction and test phases.
Figure 3B:
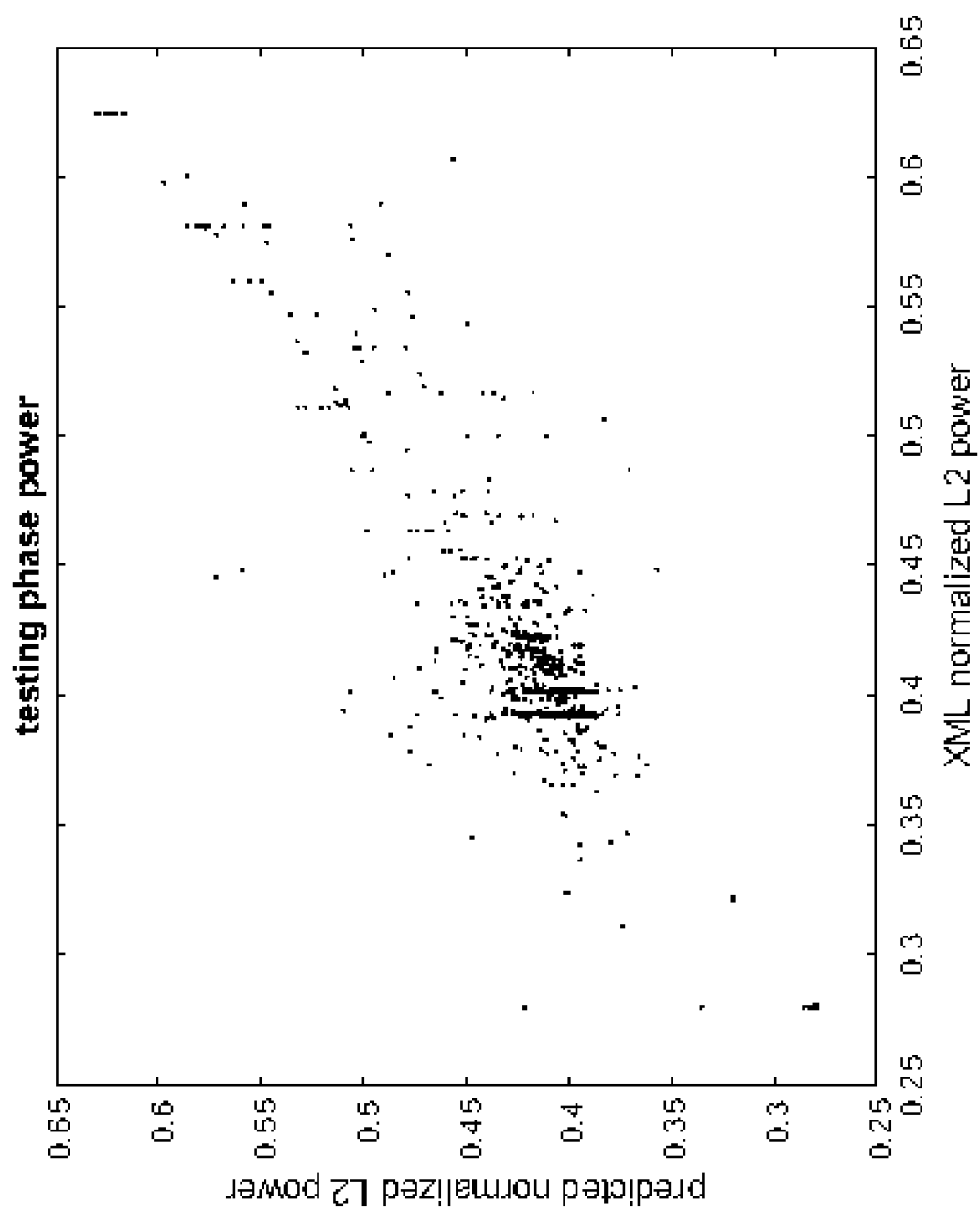

FIG. 3A and FIG. 3B depict correlations between predicted values (denoted as "Predicted normalized L2 Power") of a L2 parameter such as L2 power parameter and corresponding colorist manually generated values (denoted as "XML normalized L2 Power") of the same L2 parameter in the prediction phase and in the test phase, respectively.

Multiple Parameter Prediction/Estimation Through Tone Curve Prediction

Since some image metadata parameters such as power, slope and offset used to perform adjustments or trim pass operations on a tone mapping curve/mapping are closely correlated and are used in combination to build the new trim tone curve, these parameters may have high correlations. Thus, another way to predict the parameters is through a two-step procedure: (1) first estimating a (e.g., trimmed, targeted, final, etc.) tone curve/mapping; (2) then estimating parameters (e.g., SOP, trim parameters, etc.) used to perform curve adjustments and/or trim pass operations to approximate the (e.g., trimmed, targeted, final, etc.) tone curve/mapping.

In some embodiments, the (e.g., trimmed, targeted, final, etc.) tone curve/mapping can be first predicted through predicting sample points using a GPR-based prediction model trained through F images/frames.

For the j-th image/frame, the tone mapping curve may be represented as a function of L1 parameters (e.g., maximum, minimum, average luma values $L_{1,j}^{(max)}, L_{1,j}^{(min)}, L_{1,j}^{(avg)}$ for the j-th image/frame, etc.) and L2 parameters (e.g., slope, offset, power parameters $L_{2,j}^{(S)}, L_{2,j}^{(O)}, L_{2,j}^{(P)}$ for the j-th image/frame, etc.). Given a pre-tone-mapped sample point $v_j^{(m)}$ (e.g., representing a luma codeword, etc.) in a pre-tone-mapped HDR image, a tone mapped value $s_j^{(m)}$ in a tone-mapped SDR image can be derived from a tone mapping curve/function as follows:

$$s_j(m) = TM(L_{1,j}^{(max)}, L_{1,j}^{(min)}, L_{1,j}^{(avg)}, L_{2,j}^{(S)}, L_{2,j}^{(O)}, L_{2,j}^{(P)}, v_j^{(m)}) \quad (28)$$

M sample points $\{v_j^{(m)}\}$ can be chosen to distribute over a codeword space such as a normalized (e.g., luma, etc.) codeword range of [0, 1]. The M sample points may be distributed uniformly or non-uniformly in the codeword space. M (corresponding) mapped values $\{s_j^{(m)}\}$ may be respectively derived from the M sample points $\{v_j^{(m)}\}$. A GPR-based prediction model can be used to predict these M mapped values $\{s_j^{(m)}\}$ using image data features collected or derived from training images, test images, and/or to-be-predicted images. For example, the GPR-based prediction model can use M GPR predictors to predict these M mapped values $\{_j^{(m)}\}$.

An example procedure for generating an input (feature) matrix denoted as X comprising feature vectors and a targeted observation vector comprising targeted observations $y^{(m)}[j]$ for the M mapped values $\{s_j^{(m)}\}$ for the F (training) images/frames is illustrated in TABLE 8 below.

TABLE 8

X = $0_{K\times F}$ // initialize training input matrix
$y^{(m)}$ = $0_F$ // initialize training targeted observation vector
for each frame j among F-frame database
   // for input matrix
   for k = 0 : 1 : K-1
      use index k to find corresponding $(\alpha,\beta,\gamma)$ from H.
      X[k, j] = $h_j^y(\alpha,\beta,\gamma)$ // denote $x_{k,j}$ = X[k,j]
   end
   // for observation
   $y^{(m)}[j]$ = $s_j^{(m)}$ // mapped values in frame j
end Following the same or similar procedure discussed above, the m-th predictor for predicting the m-th mapped value in the M mapped values $\{s_j^{(m)}\}$ can be defined as follow:

$$\hat{s}^{(m)} = \sum_{q=0}^{F-1} w_q^{(m)} \cdot r^{(m)}(\hat{x}, x_q) \tag{29}$$

for $m = 0, \ldots, M-1$
where $$r^{(m)}(\hat{x}, x_q) = \sigma_f^{(m)2}\left(1 + \frac{\sum_{k=0}^{K-1}(\hat{x}_k - x_{q,k})^2}{2\alpha^{(m)}l^{(m)2}}\right)^{-\alpha(m)} \tag{30}$$

Given an input feature vector $\hat{x}$ comprising image data features extracted from an image/frame or a scene comprising multiple images (e.g., a training image/frame or scene, a test image/frame or scene, a to-be-predicted image/frame or scene, etc.), the M predictors as illustrated in expression (30) above may be used to predict the mapped values $\{\hat{s}^{(m)}\}$.

Figure 3C:
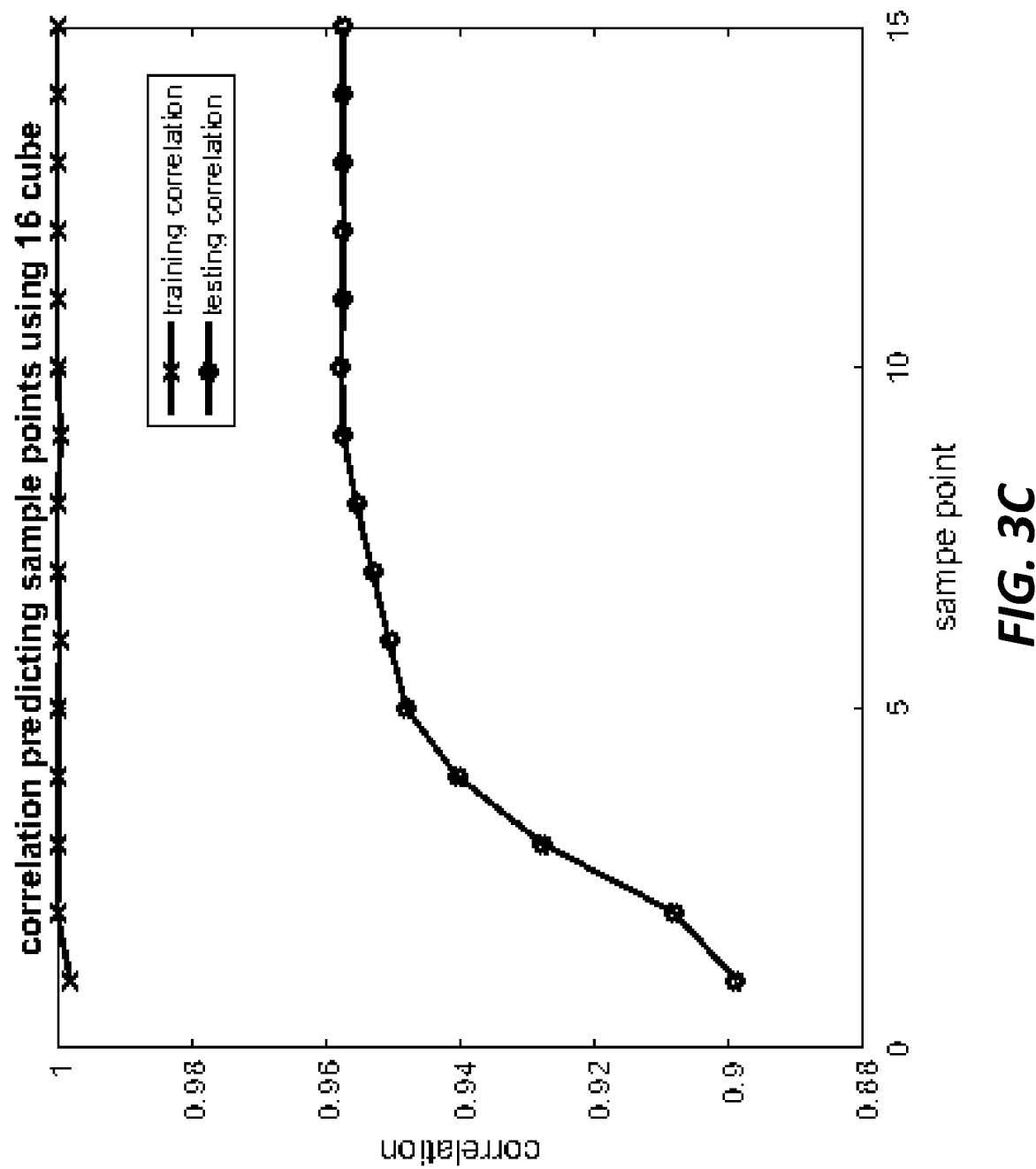
FIG. 3C depicts correlations between predicted values of sample points and corresponding colorist manually generated values of the sample points.

FIG. 3C depicts correlations between predicted values (denoted as "correlation") of sample points and corresponding colorist manually generated values (denoted as "sample points") of the sample points.

In the second stage of this prediction method/algorithm/process/procedure, having generated these mapped values $\{\hat{s}^{(m)}\}$ predicted from the M sample points $\{v_j^{(m)}\}$, the L2 parameters can then be estimated for a tone mapping curve/function representing a mapping between the M sample points $\{v_j^{(m)}\}$ and the mapped values $\{\hat{s}_j^{(m)}\}$.

Mapped values $\bar{s}_j^{(m)}$ can be first obtained using a first tone mapping curve without the L2 parameters (or set to zeros) as follows:

$$\bar{s}_j^{(m)} = TM(L_{1,j}^{(max)}, L_{1,j}^{(min)}, L_{1,j}^{(avg)}, 0, 0, 0, v_j^{(m)}) \tag{31-1}$$

Mapped values $\hat{s}_j^{(m)}$ can then be obtained using a second tone mapping curve with the L2 parameters $L_{2,j}^{(S)}$, $L_{2,j}^{(O)}$, $L_{2,j}^{(P)}$ (e.g., not set to zeros, etc.). The mapped values $\hat{s}_j^{(m)}$ obtained with the L2 parameters $L_{2,j}^{(S)}$, $L_{2,j}^{(O)}$, $L_{2,j}^{(P)}$ are related to the mapped values $\bar{s}_j^{(m)}$ obtained without the L2 parameters (or set to zeros), as follows:

$$\hat{s}_j^{(m)} = \left((L_{2,j}^{(S)} + 1) \cdot \bar{s}_j^{(m)} + L_{2,j}^{(O)}\right)^{L_{2,j}^{(P)}} \tag{31-2}$$

Given the predicted value $\{\hat{s}_j^{(m)}\}$ as predicted from the GPR predictors as illustrated in expression (29) above, the problem of determining optimal values for the L2 parameters $L_{2,j}^{(S)}$, $L_{2,j}^{(O)}$, $L_{2,j}^{(P)}$ (e.g., not set to zeros, etc.) can be formulated as an optimization problem to search for the optimal values for the L2 parameter $(\hat{L}_{2,j}^{(S)}, \hat{L}_{2,j}^{(O)}, \hat{L}_{2,j}^{(P)})$ such that:

$$(\hat{L}_{2,j}^{(S)}, \hat{L}_{2,j}^{(O)}, \hat{L}_{2,j}^{(P)}) = \arg\min_{L_{2,j}^{(S)}, L_{2,j}^{(O)}, L_{2,j}^{(P)}} \sum_{m=0}^{M-1} \|\bar{s}_j^{(m)} - \hat{s}_j^{(m)}\|^2 \tag{32}$$

Additionally, optionally or alternatively, in some embodiments, range constraints (e.g., C1, C2, C3, etc., below) may be applied to constrain, or limit the search space for, the optimal values of the L2 parameters as follows:

$C1 : -1 \leq L_{2,j}^{(S)} \leq 1$ $C2 : -1 \leq L_{2,j}^{(O)} \leq 1$ $C3 : -1 \leq L_{2,j}^{(P)} \leq 1 \tag{33}$ In some embodiments, some sample points may lie outside a specific valid data value range (e.g., below a lower data value threshold, above an upper data value threshold, below 5% of the specific valid data value range, above 95% of the specific valid data value range, below 5% of a distribution, above 95% of the distribution, etc.) for an image/frame such as the j-th image/frame.

Denote minimal and maximal valid sample points as $m_j^{(min)}$ and $m_j^{(max)}$. Given the predicted value $\{\hat{s}_j^{(m)}\}$ as predicted from the GPR predictors as illustrated in expression (29) above, the problem of determining optimal values for the L2 parameters $L_{2,j}^{(S)}$, $L_{2,j}^{(O)}$, $L_{2,j}^{(P)}$ (e.g., not set to zeros, etc.) can be formulated or reformulated as an optimization problem to search for the optimal values for the L2 parameter $(\hat{L}_{2,j}^{(S)}, \hat{L}_{2,j}^{(O)}, \hat{L}_{2,j}^{(P)})$ based on sample points within the specific valid data value range such that:

$$(\hat{L}_{2,j}^{(S)}, \hat{L}_{2,j}^{(O)}, \hat{L}_{2,j}^{(P)}) = \arg\min_{L_{2,j}^{(S)}, L_{2,j}^{(O)}, L_{2,j}^{(P)}} \sum_{m=m_j^{(min)}}^{m_j^{(max)}} \|\bar{s}_j^{(m)} - \hat{s}_j^{(m)}\|^2 \tag{34}$$

s.t.

$-1 \leq L_{2,j}^{(S)} \leq 1$ $-1 \leq L_{2,j}^{(O)} \leq 1$ $-1 \leq L_{2,j}^{(P)} \leq 1$ In some embodiments, non-linear curve fitting operations may be applied in the expression (34) above to find the optimal values for the L2 parameters. In some non-limiting implementation examples, to simplify solving the optimization problem, a simple three-"for"-loop search on a fixed discrete data point set can be conducted.

A difference between (1) directly estimating the L2 parameters and (2) first predicting sample points and then estimating SOP by solving the optimization problem is in that the former method may be more computationally efficient at least in some implementation examples, whereas the latter method may consume much more computation resources.

Prediction from SDR Domain

In some embodiments, (e.g., training, test, etc.) images in a training and test database used to train and/or test predictors or prediction models for image metadata parameters such as L2 parameters (e.g., SOP, etc.) are HDR images in an HDR domain. An example HDR domain may, but is not necessarily limited to only, be an image representation domain of 4000 nits as peak luminance, P3 as color gamut, YCbCr as color space, and so forth. Example HDR images may, but are not necessarily limited to only, be images related to video gaming, etc.

For applications (e.g., gaming applications, video applications, display applications, augmented reality or AR applications, virtual reality or VR applications, remote presence applications, mobile apps, etc.) with SDR images as input, the SDR images may be represented in an SDR domain. An example SDR domain may, but is not necessarily limited to only, be an image representation domain of 100 nits as peak luminance, Rec. 709 as color gamut, RGB (e.g., as specified in Rec. 709, etc.) as color space, and so forth. Example SDR images may, but are not necessarily limited to only, be SDR+ images, etc.

Prediction techniques as described herein can be implemented to allow prediction of optimal values of image metadata parameters directly from image data features extracted from SDR images (including but not limited to SDR+ images) represented in the SDR domain. As a result, a large amount of intensive computation, which otherwise would be incurred, can be avoided. Example prediction techniques as described herein may include, but are not necessarily limited to only, feature transfer techniques, reverse mapping techniques for (e.g., training, test, etc.) images in the training and test database.

SDR Domain Prediction Through Feature Transfer

The feature transfer techniques can be used to generate a histogram bin transfer function from the SDR domain (including but not limited to SDR+ domain) to the HDR domain.

In some embodiments, a j-th input image (e.g., a j-th to-be-predicted image, etc.)—or a j-th input scene—from an input source (e.g., an input SDR video signal, an input SDR+ video signal, etc.) is represented in the SDR domain. SDR image data features such as histograms bins or cubes with pixel counts—similar to bins and cubes in the previously discussed histograms related to HDR images—can be first extracted from pixel values in the input SDR image. These SDR image data features can be then converted into corresponding HDR image data features such as histograms bins or cubes with pixel counts in the HDR domain (e.g., with a peak luminance 4000 nits, etc.), for example with bin transfer function (denoted as $T_j^{s \to v}$) as follows:

$$(\alpha_v, \beta_v, \gamma_v) = T_j^{s \to v}(\alpha_s, \beta_s, \gamma_s) \quad (35)$$

where $(\alpha_v, \beta_v, \gamma_v)$ denotes pixel/codeword values in the HDR domain or in an HDR codeword space, and $(\alpha_s, \beta_s, \gamma_s)$ denotes pixel/codeword values in the SDR domain or in an SDR codeword space.

Pixel counts of bins/cubes of an SDR 3D histogram (denoted as $h_j^s(\alpha_s, \beta_s, \gamma_s)$ for the j-th image) can be directly extracted from pixel values of the input SDR image. Pixel counts of bins/cubes of an HDR 3D histogram (denoted as $h_j^v(\alpha_v, \beta_v, \gamma_v)$ for the j-th image) can be computed based on the pixel counts of the bins/cubes of the SDR 3D histogram using the bin transfer function $T_j^{s \to v}$ as illustrated in expression (35) above. In other words, the bin transfer function $T_j^{s \to v}$ transfer the SDR 3D histogram $h_j^s(\alpha_s, \beta_s, \gamma_s)$ in the SDR domain to the HDR 3D histogram $h_j^v(\alpha_v, \beta_v, \gamma_v)$ in the HDR domain.

The bin transfer function $T_j^{s \to v}$ can be built by passing the center point of each bin/cube into a backward reshaping function for the j-th image as follows:

$$v_j^y = BLUT_j^y(s_j^y) \quad (36\text{-}1)$$

$$v_j^{c0} = MMR_j^{c0}(s_j^y, s_j^{c0}, s_j^{c1}) \quad (36\text{-}2)$$

$$v_j^{c1} = MMR_j^{c1}(s_j^y, s_j^{c0}, s_j^{c1}) \quad (36\text{-}3)$$

where $s_j^y$, $s_j^{c0}$, $s_j^{c1}$ denote SDR component codewords in the j-th image $v_j^y$, $v_j^{c0}$, $v_j^{c1}$ denote HDR component codewords corresponding to the SDR component codewords $s_j^y$, $s_j^{c0}$, $s_j^{c1}$ in the j-th image; $BLUT_j^y$ denotes a backward reshaping function for the luma color component/channel; $MMR_j^{c0}$ and $MMR_j^{c1}$ denote backward reshaping functions for the chroma color components/channels.

Example backward reshaping functions/mappings for luma and chroma component/channels are described in U.S. Provisional Application Ser. No. 62/636,388, filed on Feb. 28, 2018, the entire contents of which are hereby incorporated by reference as if fully set forth herein.

An example procedure for building the bin transfer function $T_j^{s \to v}$ is illustrated in TABLE 9 below.

TABLE 9

// initialization
$h^s (\alpha, \beta, \gamma) = 0$ for all cube index $(\alpha, \beta, \gamma)$ for input frame
// scan for each pixel
for each $(\alpha_s, \beta_s, \gamma_s)$ in SDR domain
   find center point
     $s_j^y = (\alpha_s + 0.5) \cdot M$, $s_j^{c0} = (\beta_s + 0.5) \cdot M$, $s_j^{c1} = (\gamma_s + 0.5) \cdot M$
   Apply backward reshaping function
     $v_j^y = BLUT_j^y(s_j^y)$
     $v_j^{c0} = MMR_j^{c0}(s_j^y, s_j^{c0}, s_j^{c1})$
     $v_j^{c1} = MMR_j^{c1}(s_j^y, s_j^{c0}, s_j^{c1})$
   Find the cube index $$\alpha_v = \text{round}\left(\frac{v_j^y}{M}\right), \beta_v = \text{round}\left(\frac{v_j^{c0}}{M}\right), \text{ and } \gamma_v = \text{round}\left(\frac{v_j^{c1}}{M}\right)$$

Add mapping entry $(\alpha_s, \beta_s, \gamma_s) \to (\alpha_v, \beta_v, \gamma_v)$ to the transfer function
     $(\alpha_v, \beta_v, \gamma_v) = T_j^{s \to v}(\alpha_s, \beta_s, \gamma_s)$
end In some embodiments (e.g., a static mode, etc.), the bin transfer function may be a fixed function to be applied to some or all of input images from the input source. For example, the bin transfer function $T_j^{s \to v}$ may be represented with a mapping table that is pre-calculated and stored in memory (e.g., core memory, main memory, fast access memory, etc.) after a boot up of an application or a system implementing prediction techniques as described herein.

An example procedure for generating the SDR 3D histogram from pixel values of the j-th image is illustrated in TABLE 10 below.

TABLE 10

```
// initialization
h^s (α, β, γ) = 0 for all cube index ( α, β, γ ) for input frame
// scan for each pixel
for each pixel i in the j-th image from an input signal
    find bin index for value (s_{ji}^y, s_{ji}^{c0}, s_{ji}^{c1}) as α, β, γ
```

$$\alpha_{ji} = \text{round}\left(\frac{s_{ji}^y}{M}\right), \beta_{ji} = \text{round}\left(\frac{s_{ji}^{c0}}{M}\right), \text{ and } \gamma_{ji} = \text{round}\left(\frac{s_{ji}^{c1}}{M}\right)$$

```
    h_j^s (α, β, γ) ++
end
```

An example procedure for transferring the cubes/bins (or image data features) in the SDR 3D histogram to the cubes/bins in the EDR 3D histogram is illustrated in TABLE 11 below.

TABLE 11

```
// initialization
h^v (α, β, γ) = 0 for all cube index (α, β, γ) for input frame
// scan for each pixel
for each (α_s,β_s,γ_s) in SDR domain
    find bin index in EDR domain via (α_v,β_v,γ_v) = T_j^{s→v}(α_s,β_s,γ_s)
    update the 3D histogram in EDR domain
        h_j^v(α_v,β_v,γ_v) = h_j^v(α_v,β_v,γ_v) + h_j^s(α_s,β_s,γ_s)
End
```

The procedures as illustrated above in TABLEs 9-11 go through all possible cubes/bins (covering all possible codewords in an SDR codeword space for pixel/codeword values) in the SDR 3D histogram. It should be noted that, in some embodiments, (a limited number of) significant HDR image features such as HDR cubes/bins with pixel counts greater than a pixel count threshold may be used for prediction instead of all HDR image features that may or may not be significant. These significant HDR features may form an HDR feature set (denoted as H) covering one or more codeword portions/regions but not all of possible HDR codewords $\{\alpha_v, \beta_v, \gamma_v\}$ in an HDR code space. SDR image features such as SDR cubes/bins giving rise to the significant HDR cubes/bins after applying the bin transfer function may form a corresponding SDR feature set $H_s$ instead of all possible SDR codewords $\{(\alpha_s, \beta_s, \gamma_s)\}$ in the SDR codeword space. The SDR feature set $H_s$ can be constructed by reversely tracking back from an inverse bin transfer function $(\alpha_s, \beta_s, \gamma_s) = T_j^{v \to s}(\alpha_v, \beta_v, \gamma_v)$. As a result, feature construction can be reduced from $M^3$ to K in the SDR domain and/or in the HDR domain.

SDR Domain Prediction Through Reverse Mapping

The accuracy of feature transfer between histograms in the SDR and HDR domains relies, to a great extent, on high precisions of both the SDR histogram and the bin transfer function. If the SDR histogram is of low precision, then a transferred HDR histogram may encounter many one-to-many mapping issues (e.g., pixels in an SDR cube/bin of the SDR histogram mapping to multiple HDR cubes in the HDR histogram). Other issues include additional computation costs for the histogram transfer (or the feature transfer between histograms in the SDR and HDR). Computation costs are likely to become much higher for higher precision histogram and transfer function.

In some embodiments, instead of or in addition to the feature transfer, the reverse mapping techniques may be implemented to generate SDR images by reverse mapping (e.g., training, test, etc.) HDR images in the training and test database. Once the reverse mapped SDR images are created, predictor(s) or prediction models can then be trained and/or tested with the SDR images generated from reverse mapping the HDR images in the training and test database. In some embodiments, a (e.g., complete, etc.) reverse mapping may map each bin of HDR codewords to a respective bin of SDR codewords.

In some embodiments, a goal to be achieved by the reverse mapping operations is that a backward reshaped HDR image generated by applying a static backward reshaping function/mapping to a reversed mapped SDR image which is an SDR image generated from reverse shaping a corresponding original HDR image is as close to the corresponding original HDR image as possible. In other words, the reverse mapping approximates a complete (e.g., mathematical, etc.) inverse of the static backward reshaping function/mapping, where the static backward reshaping function/mapping is applied to the reversed mapped SDR image to generate the backward reshaped HDR image that approximates closely to the corresponding original HDR image.

Figure 2B:
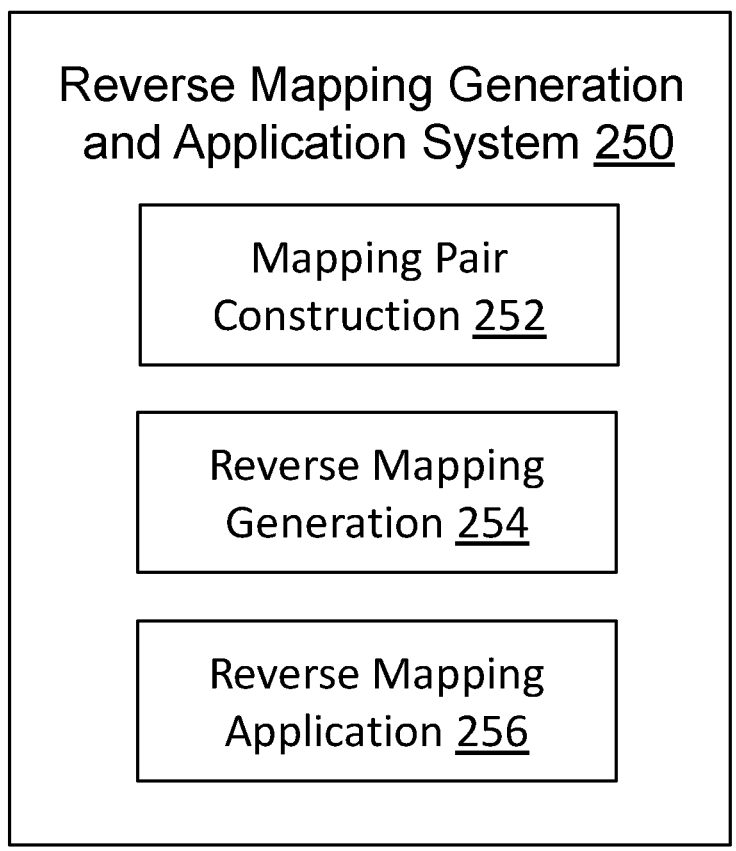
FIG. 2B illustrates an example reverse mapping generation and application system.

FIG. 2B illustrates an example reverse mapping generation and application system 250 in connection with prediction operations using SDR images as input. This system (250) may operate separately but in conjunction with the video deliver pipeline (100). Additionally, optionally or alternatively, the system (250) may be implemented as a part of the video delivery pipeline (100). The system (250) may be implemented by one or more computing processors such as one or more of: video encoders, video codecs, video decoders, video transcoders, video streaming servers, gaming machines, video broadcast servers, etc. In some embodiments, the system (250) comprises some or all of three main system blocks or stages.

In the first system block or stage (252), mapping pairs from SDR to EDR are constructed based on the static backward reshaping curve/function. First, a (e.g., complete, etc.) set of 3D SDR sampling points may be distributed throughout a 3D SDR codeword space (or the SDR domain). An example 3D SDR codeword space (or SDR domain) may, but is not necessarily limited to only, be a three-dimensional (3D) SDR RGB color space comprising a full range of possible RGB values (e.g., used in most TIFF files, etc.) representable in SDR image data in the 3D SDR RGB color space. In general, the 3D SDR sampling points may or may not be distributed uniformly in the 3D SDR RGB color space. By way of example but not limitation, the 3D SDR sampling points are created by uniformly sampling the 3D SDR RGB color space.

In some embodiments, M bins (e.g., non-overlapping bins, non-overlapping subdivisions, etc.) are used to collectively cover each dimension of the 3D SDR RGB color space. Additionally, optionally or alternatively, sample points or bins equivalent to or similar to those sampling points in the 3D SDR RGB color space may be used to sample a different color space (e.g., a targeted YCbCr color space, etc.) other than the 3D SDR RGB color space. For example, color space transformation/conversion may be used to convert RGB values or sample points in the 3D SDR RGB color space to YCbCr values or sample points in the targeted YCbCr color space.

A static backward reshaping function/mapping/curve may be applied to the sample points in the 3D SDR (e.g., YCbCr, RGB, etc.) color space and convert the sample points in the 3D SDR (e.g., YCbCr, RGB, etc.) color space into respective mapped HDR values in an HDR color space (or HDR domain). The sample points in the 3D SDR (e.g., YCbCr, RGB, etc.) color space (or SDR domain) and the respective mapped HDR values in the HDR color space (or HDR domain) may be used to form the mapping pairs as mentioned above. More specifically, each of the sample points and its respective mapped HDR value forms a mapping pair.

An example procedure for generating the mapping pairs (denoted as $MT_j$) from SDR to HDR is illustrated in TABLE 12 below.

TABLE 12

```
// initialization
MT_j={ } // SDR to EDR mapping table
k = 0;
// compute for all M³ cubes
for each (α_s,β_s,γ_s) in SDR domain
    find center point
        s_j^R(α_s,β_s,γ_s) = (α_s+ 0.5)/M ,
        s_j^G(α_s,β_s,γ_s) = (β_s + 0.5)/M ,
        s_j^B(α_s,β_s,γ_s) = (γ_s+ 0.5)/M
    (Optional) Apply color space transform CT
        [s_j^y(α_s,β_s,γ_s) s_j^c0(α_s,β_s,γ_s) s_j^c1(α_s,β_s,γ_s)] = CT([s_j^R s_j^G s_j^B])
    Apply backward reshaping function
        v_j^y(α_s,β_s,γ_s) = BLUT_j^y(s_j^y (α_s,β_s,γ_s)
        v_j^c0(α_s,β_s,γ_s) = MMR_j^c0(s_j^y (α_s,β_s,γ_s), s_j^c0(α_s,β_s,γ_s), s_j^c1(α_s,β_s,γ_s))
        v_j^c1(α_s,β_s,γ_s) = MMR_j^c1(s_j^y (α_s,β_s,γ_s), s_j^c0(α_s,β_s,γ_s), s_j^c1(α_s,β_s,γ_s))
    Add additional entry k to mapping table MT_j
        By given input s_{j,k}= [s_j^y(α_s,B_s,y_s) s_j^c0(α_s,β_s,γ_s) sj^c1 (α_s,β_s,γ_s)],
            and mapped output v_{j,k} = [v_j^y(α_s,β_s,γ_s) v_j^c0(α_s,β_s,γ_s) v_j^c1(α_s,β_s,γ_s)]
        v_{j,k} = MT_{j,k} (s_{j,k})
        k ++
end
```

In some embodiments, the mapping pairs MT comprising the sample points in SDR and the respective mapped values in HDR may be represented as a mapping table such as a three-dimensional lookup table (3D-LUT).

In the second system block or stage (254), a reverse mapping is obtained using the mapping pairs MT (e.g., mapping table, 3D-LUT, etc.). A number of different methods can be used to find the reverse mapping from the mapping table representing the mapping pairs $MT_j$. The simplest way is to use (e.g., linear, bicubic, etc.) interpolation based on the mapping pairs $MT_1$ (e.g., mapping table, 3D-LUT, etc.) to derive the reverse mapping. In some operational scenarios, the reverse mapping obtained from interpolation is relatively inaccurate. Advanced methods, such as neural network, GPR, and so forth can also be used to find this reverse mapping from the mapping pairs MT (e.g., mapping table, 3D-LUT, etc.).

Deriving Reverse Mapping from Neural Networks

A neural network represents a universal function approximator using one or more hidden layers. To construct the reverse mapping function from HDR to SDR, input (or values to be mapped by the static backward reshaping function/curve/mapping) and output (or mapped values generated from the input by the static backward reshaping function/curve/mapping) in the mapping pairs MT (e.g., mapping table, 3D-LUT, etc.) may be reversed or transposed to become output and input of the neural network. More specifically, the input or the values to be mapped by the static backward reshaping function/curve/mapping in the mapping pairs MT (e.g., mapping table, 3D-LUT, etc.), may be used as targeted values to be generated by the neural network, whereas the output or the mapped values generated from the input by the static backward reshaping function/curve/mapping in the mapping pairs MT (e.g., mapping table, 3D-LUT, etc.) may be used as the input or input values to be used by the neural network to generate the targeted value, In some embodiments, a neural network may be built with three inputs (e.g., corresponding to 3D HDR values, etc.) and three outputs (e.g., corresponding to 3D SDR values, etc.). Additionally, optionally or alternatively, three neural networks may be built; each of the three neural networks may be built with three inputs (e.g., corresponding to 3D HDR values, etc.) and only one output (e.g., corresponding to one dimension in the 3D SDR values, etc.).

All the mapped HDR values (as mapped by the static backward reshaping function/curve/mapping) may be collected together in a matrix as follows:

$$V_j = \begin{bmatrix} v_{j,0} \\ v_{j,1} \\ \vdots \\ v_{j,m^3-1} \end{bmatrix} \quad (37)$$

All SDR values, corresponding to the mapped HDR values, may be collected together in a matrix (to be used in a three-input-three-output neural network) as follows:

$$S_j = \begin{bmatrix} s_{j,0} \\ s_{j,1} \\ \vdots \\ s_{j,m^3-1} \end{bmatrix} \quad (38)$$

Additionally, optionally or alternatively, individual channels (e.g., color component values, color channel values in all the SDR values corresponding to the mapped HDR values may be collected together in three matrixes (to be used in three three-input-one-output neural network respectively) as follows:

$$s_j^y = \begin{bmatrix} s_{j,0}^y \\ s_{j,1}^y \\ \vdots \\ s_{j,m^3-1}^y \end{bmatrix} \quad (39\text{-}1)$$

$$s_j^{c0} = \begin{bmatrix} s_{j,0}^{c0} \\ s_{j,1}^{c0} \\ \vdots \\ s_{j,m^3-1}^{c0} \end{bmatrix} \quad (39\text{-}2)$$

$$s_j^{c1} = \begin{bmatrix} s_{j,0}^{c1} \\ s_{j,1}^{c1} \\ \vdots \\ s_{j,m^3-1}^{c1} \end{bmatrix} \quad (39\text{-}3)$$

A L-hidden layer three-input-three-output neural network reverse mapping can be expressed as follows:

$$\hat{s}_{j,k} = f_L(W_L \ldots f_1(W_1 f_0(W_0 v_{j,k} \ominus b_0) + b_1) \ldots + b_{L-1}) \quad (40)$$

where l is an integer between 0 and L−1; $W_l$ represents a weighting matrix; to $b_l$ represents a bias vector; $f_l()$ represents an activation function. A variety of activation functions including but not limited to those commonly used activation functions may be used. An example activation function is the sigmoid function as follows:

$$f_j(t) = \frac{2}{1 + e^{-2t}} - 1 \quad (41)$$

In some embodiments, a goal is to find the reverse mapping parameters $MT_j^{-1} = \{W_l, b_l\}$ in all (L) layers to minimize the total mean-squared-error (MSE) for all $M^3$ entries, as follows:

$$E = \sum_{k=0}^{M^3-1} |s_{j,k} - \hat{s}_{j,k}|^2 \quad (42)$$

The problem of minimizing the MSE can also be formally formulated as $$\arg\min_{\{W_l, b_l\}} \sum_{k=0}^{M^3-1} |s_{j,k} - \hat{s}_{j,k}|^2 \quad (43)$$

Techniques as described above in connection with the three-input-three-output neural network can be relatively easily extended to use three individual three-input-one-output neural networks respectively for three color channels, instead of using the three-input-three-output neural network.

In some embodiments, GPR may be used to predict targeted SDR values from HDR values, instead of or in addition to using neural network(s) to generate the targeted SDR values from the HDR values. In some operational scenarios, GPR may incur relatively high computation costs, especially when parallel computing is not available.

In the third system block or stage (256), the reverse mapping as generated in the second system block (254) may be applied to obtain corresponding SDR images for building/training and/or testing GPR-based predictors or prediction models that can predict image metadata parameters such as the L2 parameters as previously discussed. For example, the reverse mapping may be applied to HDR images (e.g., HDR training images, HDR test images, etc.) in the training and test database to obtain corresponding reverse mapped SDR images for training and/or testing these GPR-based predictors or prediction models that can be used to directly predict for SDR input images.

The procedure to train or test the GPR-based predictors or prediction models for SDR images is identical to or similar to the previously discussed GPR-based predictors or prediction models for HDR image.

Predictors and prediction models as described herein can support temporal stability in a wide variety of applications and video encoding frames including but not limited to real-time/linear encoding frameworks. These predictors and the prediction models can be used to make relatively smooth predictions (including but not limited to relatively smooth change of predictions) in temporal domains (e.g., within a scene, in a fade-in/fade-out, in a dissolving scene, taking into account special editing effects, etc.) to avoid or significantly reduce fluctuations in predicted values and to prevent or lessen any jitter-like artifacts.

Example Process Flows

Figure 4A:
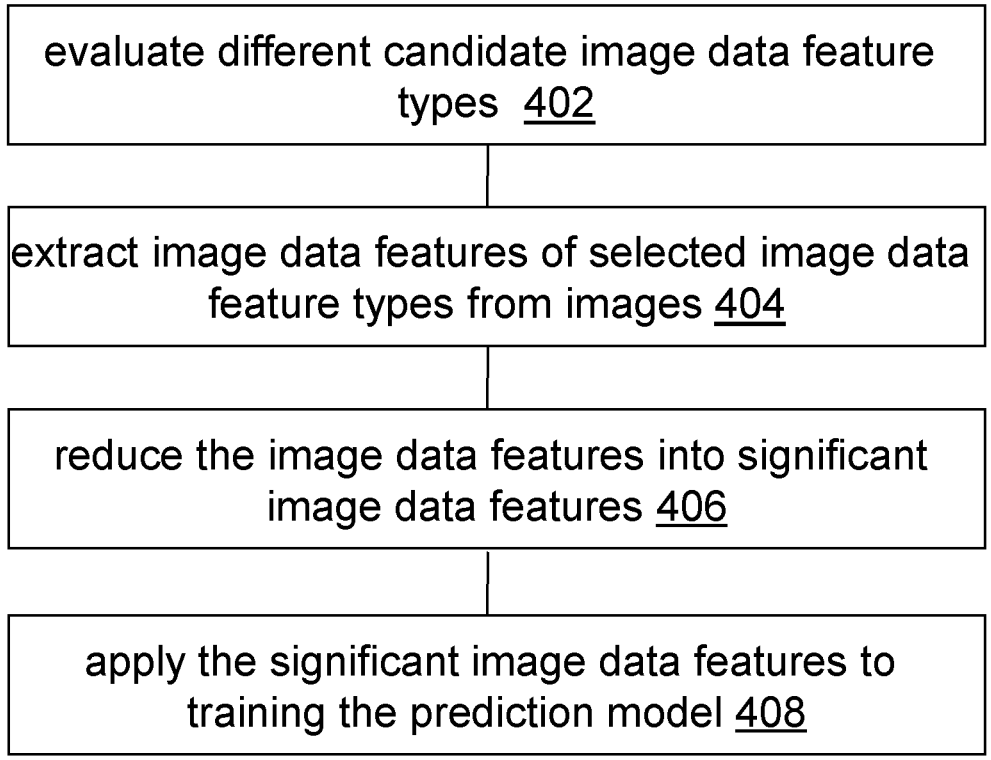

FIG. 4A illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 402, an image metadata prediction system evaluates a set of one or more different candidate image data feature types to identify one or more specific image data feature types to be used in a prediction model for optimizing one or more image metadata parameters.

In block 404, the system extracts a plurality of image data features of the one or more selected image data feature types from one or more images.

In block 406, the system reduces the plurality of image data features of the one or more selected image data feature types into a plurality of significant image data features, wherein a total number of image data features in the plurality of significant image data features is no larger than a total number of image data features in the plurality of image data features of the one or more selected image data feature types.

In block 408, the system applies the plurality of significant image data features to training the prediction model for optimizing one or more image metadata parameters.

In an embodiment, the set of one or more different candidate image data feature types includes one or more of: one-dimensional (1D) histograms, raw linear histograms, log histograms, binary histograms, three-dimensional (3D) histograms, standard deviations in a luma domain, color saturation in a luma domain, luma-chroma combined 1D histograms, etc.

In an embodiment, the plurality of significant image data features is generated at least in part by transforming a subset of image data features in the plurality of image data features of the one or more selected image data feature types into a transform domain. In an embodiment, the set of significant image data features is generated at least in part by removing a subset of low occurrence image data features from the plurality of image data features of the one or more selected image data feature types.

In an embodiment, the prediction model is based on one or more of: a parametric prediction method, a generalized linear prediction (GLM) method, a non-parametric prediction method, a Gaussian process regression (GPR) based prediction method, a neural network regression (NNR) based prediction method, etc.

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 452, an image metadata prediction system determines a plurality of sets of training images and a plurality of sets of targeted values for one or more image metadata parameters, each set of targeted values in the plurality of sets of targeted values corresponding to a respective set of one or more training images in the plurality of sets of training images.

In block 454, the system extracts a plurality of sets of image data features of one or more selected image data feature types from the plurality of sets of training images, each set of image data features in the plurality of sets of image data features corresponding to a respective set of one or more training images in the plurality of sets of training images.

In block 456, the system applies the plurality of sets of image data features of the one or more selected image data feature types and the plurality of sets of targeted values for the one or more image metadata parameters to training one or more prediction models for optimizing the one or more image metadata parameters.

In block 458, the system uses the one or more prediction models to generate one or more optimized values for the one or more image metadata parameters for one or more non-training images.

In block 460, the system causes the one or more optimized values for the one or more image metadata parameters to be used in rendering the one or more non-training images.

In an embodiment, the one or more prediction models are used to predict sample points of a tone mapping curve for tone mapping the one or more non-training images; the one or more optimized values for the one or more image metadata parameters for one or more non-training images are estimated based on the sample points of the tone mapping curve predicted with the one or more prediction models.

In an embodiment, the one or more prediction models are used to predict the one or more optimized values for the one or more image metadata parameters for one or more non-training images.

In an embodiment, the one or more selected image data feature types includes one or more of: three-dimensional (3D) histograms comprising 3D cubes with pixel counts, one-dimensional (1D) luma chroma combined histograms comprising 1D bins with pixel counts, etc.

In an embodiment, the one or more prediction models include one or more Gaussian process regression (GPR) based prediction models.

In an embodiment, the one or more non-training images represent one or more standard dynamic range (SDR) images; the plurality of sets of training images represent high dynamic range (HDR) images; the system is further configured to perform: extracting a set of non-training SDR image data features of the one or more selected image data feature types from the one or more non-training images; generating a set of non-training HDR image data features of the one or more selected image data feature types from the set of non-training SDR image data features of the one or more selected image data feature types extracted from the one or more non-training images; causing the one or more prediction models to use the set of non-training HDR image data features of the one or more selected image data feature types to generate the one or more optimized values for the one or more image metadata parameters for the one or more non-training images.

In an embodiment, the plurality of sets of training images represent a plurality of sets of standard dynamic range (SDR) training images derived from a plurality of sets of high dynamic range (HDR) training images; the system is further configured to perform: using a backward reshaping mapping to generate a mapping table from SDR codewords to HDR codewords; generating a reverse mapping to the backward reshaping mapping for each HDR image in the plurality of sets of HDR training images, wherein the reverse mapping is specific to each such HDR image; applying the reverse mapping to each such HDR image to generate a respective SDR image in the plurality of sets of SDR training images.

In an embodiment, the system is further configured to perform a color conversion operation as a part of generating the mapping table from SDR codewords to the HDR codewords.

In an embodiment, the backward reshaping mapping represents a static backward reshaping mapping that is invariant with any image in the plurality of sets of SDR training images.

In an embodiment, the one or more non-training images represent one or more of: high dynamic range (HDR) images in a gaming application, standard dynamic range plus (SDR+) images in a SDR+ video signal, images in an augmented reality (AR) application, images in a virtual reality (VR) application, images in a remote presence application, images in connection with a mobile application, images in connection with a theater display application, images in a non-theater display applications, and so forth.

In an embodiment, a set of training images in the plurality of sets of training images comprises one of: a single image, images of a single scene, etc.

In an embodiment, the one or more image metadata parameters represent one or more display management parameters.

In an embodiment, the one or more image metadata parameters represent a set of slope, offset and power parameters used to adjust a tone mapping curve for performing display management.

In an embodiment, the tone mapping curve represents one of: a standard-based tone mapping curve or a proprietary tone mapping curve.

In an embodiment, at least one of the one or more non-training images is represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, a standard dynamic range (SDR) color space, etc.

In an embodiment, at least one of the one or more non-training images is encoded in a sequence of images of the same dynamic range in a video signal of a bit depth of one of 8, 9, 10, 11, 12, 13, 14, or 15+ bits.

In an embodiment, the plurality of sets of image data features of one or more selected image data feature types is represented by histograms with a plurality of bin partitions to cover an entire range of codeword values in each color channel of a color space in which the plurality of sets of training images is represented.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
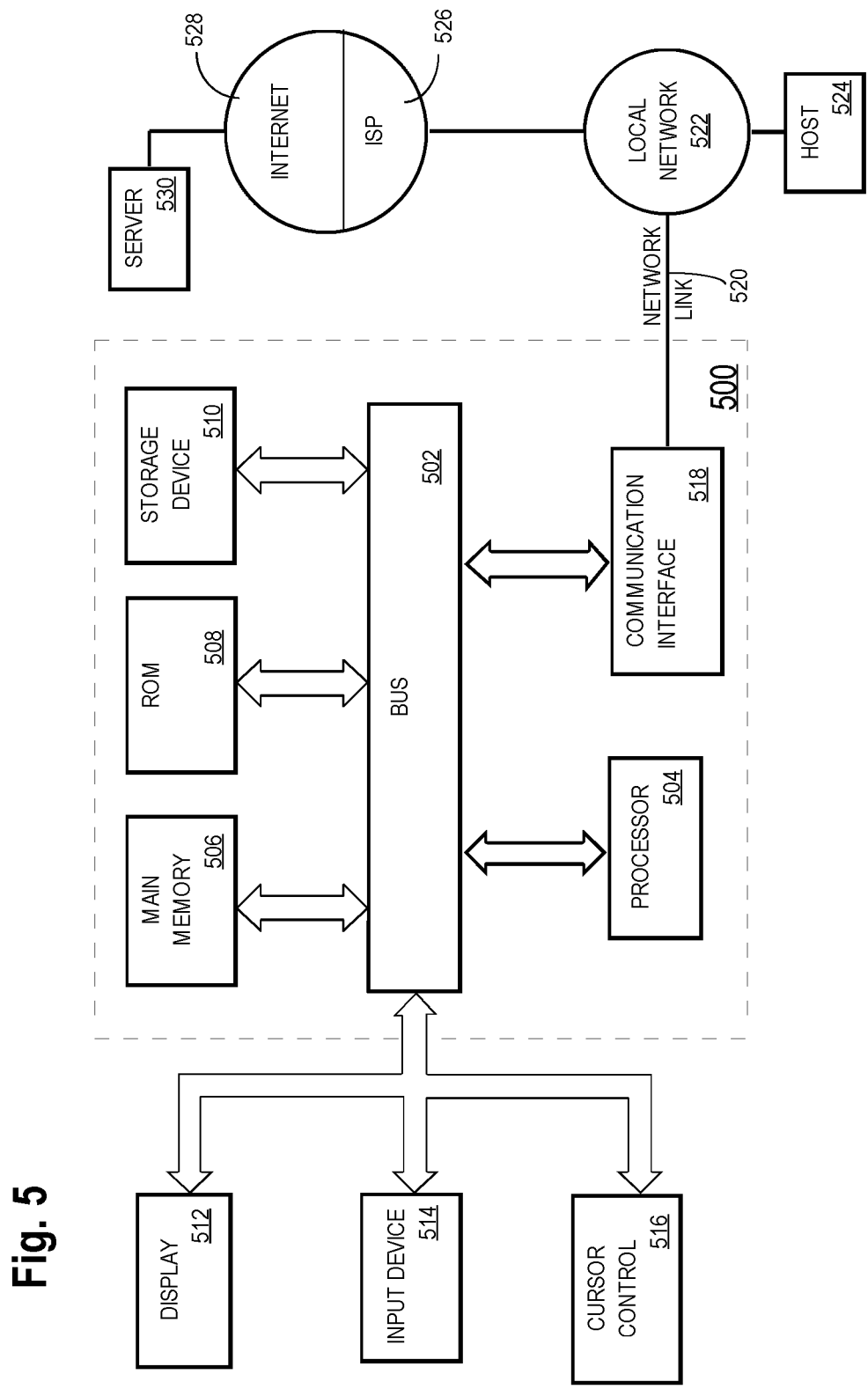
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of the present invention.

EEE1. A method for image metadata optimization, the method comprising:

evaluating a set of one or more different candidate image data feature types to identify one or more specific image data feature types to be used in training a prediction model for optimizing one or more image metadata parameters;

extracting a plurality of image data features of the one or more selected image data feature types from one or more images;

reducing the plurality of image data features of the one or more selected image data feature types into a plurality of significant image data features, wherein a total number of image data features in the plurality of significant image data features is no larger than a total number of image data features in the plurality of image data features of the one or more selected image data feature types;

applying the plurality of significant image data features to training the prediction model for optimizing one or more image metadata parameters.

EEE2. The method of EEE1, wherein the set of one or more different candidate image data feature types includes one or more of: one-dimensional (1D) histograms, raw linear histograms, log histograms, binary histograms, three-dimensional (3D) histograms, standard deviations in a luma domain, color saturation in a luma domain, or luma-chroma combined 1D histograms.

EEE3. The method of any preceding EEE, wherein the plurality of significant image data features is generated at least in part by transforming a subset of image data features in the plurality of image data features of the one or more selected image data feature types into a transform domain.

EEE4. The method of any preceding EEE, wherein the set of significant image data features is generated at least in part by removing a subset of low occurrence image data features from the plurality of image data features of the one or more selected image data feature types.

EEE5. The method of any preceding EEE, wherein the prediction model is based on one or more of: a parametric prediction method, a generalized linear prediction (GLM) method, a non-parametric prediction method, a Gaussian process regression (GPR) based prediction method, or a neural network regression (NNR) based prediction method.

EEE6. A method for image metadata optimization, the method comprising:

determining a plurality of sets of training images and a plurality of sets of targeted values for one or more image metadata parameters, each set of targeted values in the plurality of sets of targeted values corresponding to a respective set of one or more training images in the plurality of sets of training images;

extracting a plurality of sets of image data features of one or more selected image data feature types from the plurality of sets of training images, each set of image data features in the plurality of sets of image data features corresponding to a respective set of one or more training images in the plurality of sets of training images;

applying the plurality of sets of image data features of the one or more selected image data feature types and the plurality of sets of targeted values for the one or more image metadata parameters to training one or more prediction models for optimizing the one or more image metadata parameters;

using the one or more prediction models to generate one or more optimized values for the one or more image metadata parameters for one or more non-training images;

causing the one or more optimized values for the one or more image metadata parameters to be used in rendering the one or more non-training images.

EEE7. The method of EEE6, wherein the one or more prediction models are used to predict sample points of a tone mapping curve for tone mapping the one or more non-training images, and wherein the one or more optimized values for the one or more image metadata parameters for one or more non-training images are estimated based on the sample points of the tone mapping curve predicted with the one or more prediction models.

EEE8. The method of EEE6 or EEE7, wherein the one or more prediction models are used to predict the one or more optimized values for the one or more image metadata parameters for one or more non-training images.

EEE9. The method of any one of EEE6 to EEE8, wherein the one or more selected image data feature types includes one or more of: three-dimensional (3D) histograms comprising 3D cubes with pixel counts, or one-dimensional (1D) luma chroma combined histograms comprising 1D bins with pixel counts.

EEE10. The method of any one of EEE6 to EEE9, wherein the one or more prediction models include one or more Gaussian process regression (GPR) based prediction models.

EEE11. The method of any one of EEE6 to EEE10, wherein the one or more non-training images represent one or more standard dynamic range (SDR) images; wherein the plurality of sets of training images represent high dynamic range (HDR) images; the method further comprising:

extracting a set of non-training SDR image data features of the one or more selected image data feature types from the one or more non-training images;

generating a set of non-training HDR image data features of the one or more selected image data feature types from the set of non-training SDR image data features of the one or more selected image data feature types extracted from the one or more non-training images;

causing the one or more prediction models to use the set of non-training HDR image data features of the one or more selected image data feature types to generate the one or more optimized values for the one or more image metadata parameters for the one or more non-training images.

EEE12. The method of any one of EEE6 to EEE11, wherein the plurality of sets of training images represent a plurality of sets of standard dynamic range (SDR) training images derived from a plurality of sets of high dynamic range (HDR) training images; the method further comprising:

using a backward reshaping mapping to generate a mapping table from SDR codewords to HDR codewords;

generating a reverse mapping to the backward reshaping mapping for each HDR image in the plurality of sets of HDR training images, wherein the reverse mapping is specific to each such HDR image;

applying the reverse mapping to each such HDR image to generate a respective SDR image in the plurality of sets of SDR training images.

EEE13. The method of EEE12, further comprising: performing a color conversion operation as a part of generating the mapping table from SDR codewords to the HDR codewords.

EEE14. The method of EEE12, wherein the backward reshaping mapping represents a static backward reshaping mapping that is invariant with any image in the plurality of sets of SDR training images.

EEE15. The method of any one of EEE6 to EEE14, wherein the one or more non-training images represent one or more of: high dynamic range (HDR) images in a gaming application, standard dynamic range plus (SDR+) images in a SDR+ video signal, images in an augmented reality (AR) application, images in a virtual reality (VR) application, images in a remote presence application, images in connection with a mobile application, images in connection with a theater display application, or images in a non-theater display applications.

EEE16. The method of any one of EEE6 to EEE15, wherein a set of training images in the plurality of sets of training images comprises one of: a single image or images of a single scene.

EEE17. The method of any one of EEE6 to EEE16, wherein the one or more image metadata parameters represent one or more display management parameters.

EEE18. The method of any one of EEE6 to EEE17, wherein the one or more image metadata parameters represent a set of slope, offset and power parameters used to adjust a tone mapping curve for performing display management.

EEE19. The method of EEE18, wherein the tone mapping curve represents one of: a standard-based tone mapping curve or a proprietary tone mapping curve.

EEE20. The method of any one of EEE6 to EEE19, wherein at least one of the one or more non-training images is represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

EEE21. The method of any one of EEE6 to EEE20, wherein at least one of the one or more non-training images is encoded in a sequence of images of the same dynamic range in a video signal of a bit depth of one of 8, 9, 10, 11, 12, 13, 14, or 15+ bits.

EEE22. The method of any one of EEE6 to EEE21, wherein the plurality of sets of image data features of one or more selected image data feature types is represented by histograms with a plurality of bin partitions to cover an entire range of codeword values in each color channel of a color space in which the plurality of sets of training images is represented.

EEE23. A computer system configured to perform any one of the methods recited in EEEs 1-22.

EEE24. An apparatus comprising a processor and configured to perform any one of the methods recited in EEEs 1-22.

EEE25. A non-transitory computer-readable storage medium having stored thereon computer-executable instruction for executing a method in accordance with any of the methods recited in EEEs 1-22.

The invention claimed is:

1. A method for image metadata optimization, the method comprising:
   determining a plurality of sets of training images and a plurality of sets of targeted values for one or more image metadata parameters, each set of targeted values in the plurality of sets of targeted values corresponding to a respective set of one or more training images in the plurality of sets of training images;
   extracting a plurality of sets of image data features of one or more selected image data feature types from the plurality of sets of training images, each set of image data features in the plurality of sets of image data features corresponding to a respective set of one or more training images in the plurality of sets of training images;
   applying the plurality of sets of image data features of the one or more selected image data feature types and the plurality of sets of targeted values for the one or more image metadata parameters to training one or more prediction models for optimizing the one or more image metadata parameters;
   using the one or more prediction models to generate one or more optimized values for the one or more image metadata parameters for one or more non-training images;
   causing the one or more optimized values for the one or more image metadata parameters to be used in rendering the one or more non-training images;
   the method being characterized in that the one or more non-training images represent one or more standard dynamic range (SDR) images; wherein the plurality of sets of training images represent high dynamic range (HDR) images; the method further being characterized by it comprising:
   extracting a set of non-training SDR image data features of the one or more selected image data feature types from the one or more non-training images;
   generating a set of non-training HDR image data features of the one or more selected image data feature types from the set of non-training SDR image data features of the one or more selected image data feature types extracted from the one or more non-training images;
   causing the one or more prediction models to use the set of non-training HDR image data features of the one or more selected image data feature types to generate the one or more optimized values for the one or more image metadata parameters for the one or more non-training images.

2. The method of claim 1, wherein the one or more prediction models are used to predict the one or more optimized values for the one or more image metadata parameters for one or more non-training images.

3. The method of claim 1, wherein the one or more selected image data feature types includes one or more of: three-dimensional (3D) histograms comprising 3D cubes with pixel counts, or one-dimensional (1D) luma chroma combined histograms comprising 1D bins with pixel counts.

4. The method of claim 1, wherein the one or more prediction models include one or more Gaussian process regression (GPR) based prediction models.

5. The method of claim 1, wherein the one or more image metadata parameters represent one or more display management parameters.

6. The method of claim 1, wherein the one or more image metadata parameters represent a set of slope, offset and power parameters used to adjust a tone mapping curve for performing display management.

7. The method of claim 1, wherein at least one of the one or more non-training images is represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

8. The method of claim 1, wherein at least one of the one or more non-training images is encoded in a sequence of images of the same dynamic range in a video signal of a bit depth of one of 8, 9, 10, 11, 12, 13, 14, or 15+ bits.

9. The method of claim 1, wherein the plurality of sets of image data features of one or more selected image data feature types is represented by histograms with a plurality of bin partitions to cover an entire range of codeword values in each color channel of a color space in which the plurality of sets of training images is represented.

10. An apparatus comprising a processor and configured to perform the methods recited in claim 1.

11. A non-transitory computer-readable storage medium having stored thereon computer-executable instruction for executing a method in accordance with the method recited in claim 1.

* * * * *